(12) United States Patent
Ge et al.

(10) Patent No.: US 7,589,808 B2
(45) Date of Patent: Sep. 15, 2009

(54) WIDE VIEWING ANGLE TRANSFLECTIVE LIQUID CRYSTAL DISPLAYS

(75) Inventors: Zhibing Ge, Orlando, FL (US); Thomas Xinzhang Wu, Oviedo, FL (US); Shin-Tson Wu, Oviedo, FL (US); Wang-Yang Li, Xinhua Town (TW); Chung-Kuang Wei, Taipei (TW)

(73) Assignees: University of Central Florida Research Foundation, Inc., Orlando, FL (US); Chi Mei Optoelectronics Corp., Tainan (TW)

( * ) Notice: Subject to any disclaimer, the term of this patent is extended or adjusted under 35 U.S.C. 154(b) by 174 days.

(21) Appl. No.: 11/763,894

(22) Filed: Jun. 15, 2007

(65) Prior Publication Data

US 2008/0309853 A1 Dec. 18, 2008

(51) Int. Cl.
*G02F 1/1335* (2006.01)
(52) U.S. Cl. .................. 349/114; 385/96; 385/113; 385/187
(58) Field of Classification Search .................. 349/96, 349/113, 114, 187
See application file for complete search history.

(56) References Cited

U.S. PATENT DOCUMENTS

| 4,040,727 | A | 8/1977 | Ketchpel |
| 4,090,219 | A | 5/1978 | Ernstoff et al. |
| 4,093,356 | A | 6/1978 | Bigelow et al. |
| 4,572,616 | A | 2/1986 | Kowel |
| 4,720,173 | A | 1/1988 | Okada et al. |
| 4,870,396 | A | 9/1989 | Shields |
| 5,071,229 | A | 12/1991 | Oaki et al. |
| 5,150,234 | A | 9/1992 | Takahashi et al. |
| 5,499,127 | A | 3/1996 | Tsubota et al. |
| 5,699,133 | A | 12/1997 | Furuta |
| 5,886,762 | A | 3/1999 | Lee et al. |
| 5,919,606 | A | 7/1999 | Kazlas et al. |
| 6,014,188 | A | 1/2000 | Yamada et al. |
| 6,020,941 | A | 2/2000 | Ma |

(Continued)

OTHER PUBLICATIONS

A. Takaeda, et al., "41.1: A Super-High Image Quality Multi-Domain Vertical Alignment LCD by New-Rubbing-Less Technology", SID Col. 29, 1998, p. 1077. Abstract Only.

(Continued)

*Primary Examiner*—Ellen Kim
(74) *Attorney, Agent, or Firm*—Brian S. Steinberger; Phyllis K. Wood; Law Offices of Brian S. Steinberger, P.A.

(57) ABSTRACT

Apparatus, methods and systems for a transmissive liquid crystal display including a plurality of pixel circuits, each pixel circuit including a reflective region and a transmissive region. The reflective region includes a polarization dependent reflector for reflecting ambient light. The reflective and transmissive regions include an initially homogeneously aligned liquid crystal layer sandwiched between a first and a second substrate. Each pixel further includes at least one first transparent electrode as the common electrode and at least one second transparent electrode as the pixel electrode both formed on one of the same first and second substrates, wherein substantial fringe fields with rich horizontal electric fields are generated in the liquid crystal layer when voltage is applied to the pixel electrode, making the liquid crystal molecules rotate mainly in the horizontal direction to achieve wide viewing angle.

20 Claims, 29 Drawing Sheets

U.S. PATENT DOCUMENTS

| | | | |
|---|---|---|---|
| 6,124,971 | A | 9/2000 | Ouderkirk et al. |
| 6,256,010 | B1 | 7/2001 | Chen et al. |
| 6,281,952 | B1 | 8/2001 | Okamoto et al. |
| 6,295,109 | B1 | 9/2001 | Kubo et al. |
| 6,330,047 | B1 | 12/2001 | Kubo et al. |
| 6,341,002 | B1 | 1/2002 | Shimizu |
| 6,424,398 | B1 | 7/2002 | Taniguchi |
| 6,466,290 | B2 | 10/2002 | Kim et al. |
| 6,522,380 | B2 | 2/2003 | Lee et al. |
| 6,816,216 | B2 * | 11/2004 | Funamoto et al. ............ 349/113 |
| 6,977,702 | B2 | 12/2005 | Wu |
| 7,158,201 | B2 | 1/2007 | Kim et al. |
| 7,164,284 | B2 | 1/2007 | Pan et al. |
| 2002/0041356 | A1 * | 4/2002 | Tanada et al. ............... 349/158 |
| 2003/0210484 | A1 * | 11/2003 | Otake et al. ................. 359/881 |
| 2004/0207784 | A1 * | 10/2004 | Lim et al. .................... 349/114 |
| 2005/0285988 | A1 * | 12/2005 | Nakagawa ................... 349/44 |
| 2006/0007087 | A1 * | 1/2006 | Choi et al. .................... 345/88 |
| 2006/0050211 | A1 * | 3/2006 | Kim et al. .................... 349/114 |
| 2007/0004071 | A1 * | 1/2007 | Lee et al. ...................... 438/30 |
| 2007/0109453 | A1 * | 5/2007 | Kaneko et al. ................. 349/38 |
| 2008/0024402 | A1 * | 1/2008 | Nishikawa et al. ............ 345/82 |

OTHER PUBLICATIONS

Y. Kume, et al., "41.4: Advanced ASM Mode (Axially Symmetric Aligned Microcell Mode): Improvement of DisplayPerformances by Using Negative Dielectric Liquid Crystal", SID vol. 29, 1998, p. 1089, Abstract Only.

Yoshio Koike, et al., "Super High Quality MVA-TFT Liquid Crystal Displays", FUJITSU Sci. Tech. J., 35, 5, Dec. 1999, pp. 221-228.

N. Konforti, et al. "Phase-only modulation with twisted nematic liquid-crystal spatial light modulators", Optics Letters, vol. 13, No. 3, Mar. 1988, pp. 251-253.

J.S. Patel, et al., "Electrically tunable and polarization insensitive Fabry-Perot etalon with a liquid-crystal film", Applied Physics Letters, vol. 58, No. 22, pp. 2491-2493, Jun. 1991.

J.S. Patel, et al., "Polarization insensitive tunable liquid-crystal etalon filter", Applied Physics, Lett., 59, Sep. 1991, pp. 1314-1316.

Zhan He, et al., "Cylindrical Liquid crystal lens and its applications in optical pattern correlation Systems", Jpn. J. Appl. Phys., vol. 34, 1995, pp. 2392-2395.

Mao Ye, et al., "Transient Properties of a liquid-crystal microlens", Jpn J. Appl. Phys., vol. 40, 2001, pp. 6012-6016.

Hongwen Ren, et al., "Inhomogeneous nanoscale polymer-dispersed liquid crystals with gradient refractive index", Applied Physics Letters, vol. 81, No. 19, Nov. 4, 2002, pp. 3537-3539.

Seiji Fukushima, et al., "Ferroelectric liquid-crystal spatial light modulator achieving bipolar Image Operation and cascadability," Applied Optics, vol. 31, No.32, Nov. 10, 1992, pp. 6859-6868.

M.F. Schiekel, et al., "Deformation of Nematic Liquid Crystals with Vertical Orientation in Electrical Fields," Applied Physics Letters, vol. 19, No. 10, Nov. 15, 1971, pp. 391-393.

Fujimori, Kohichi, et al., "53.3: New Color Filter Structures for Transflective TFT-LCD", Sharp Corporation, Display Technology Development Group, 2002, SID Digest International Symposium, pp. 1382-1385.

Lee, Baek-Woon, et al., "40.5L: Late-News Paper: TFT-LCD with RGBW Color System", Samsung Electronics Corp., in Proceeding of International Display Manufacturing Conference 2003, SID Digest, pp. 212-215.

Shin-Tson Wu and Deng-Ke Yang, "Reflective Liquid Crystal Display", John Wiley & Sons, Ltd., 2001, Chapter 3, pp. 68-70, Chapter 4, pp. 98-104.

S.T. Wu, "Nematic liquid crystal modulator with response time less than 100 μs at room temperature," Appl. Phys. Lett., vol. 57, 1990, p. 986. Abstract Only.

* cited by examiner

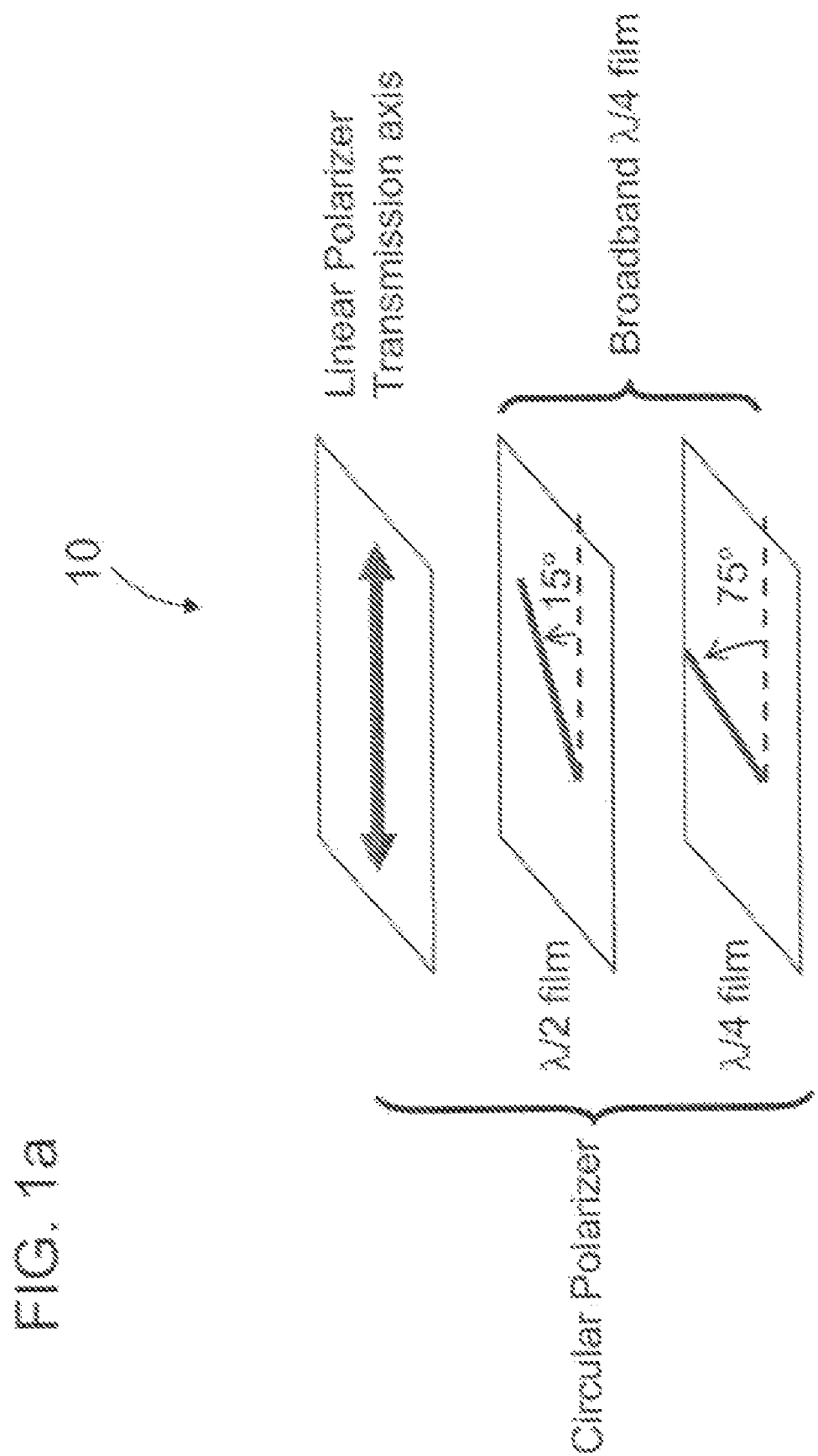

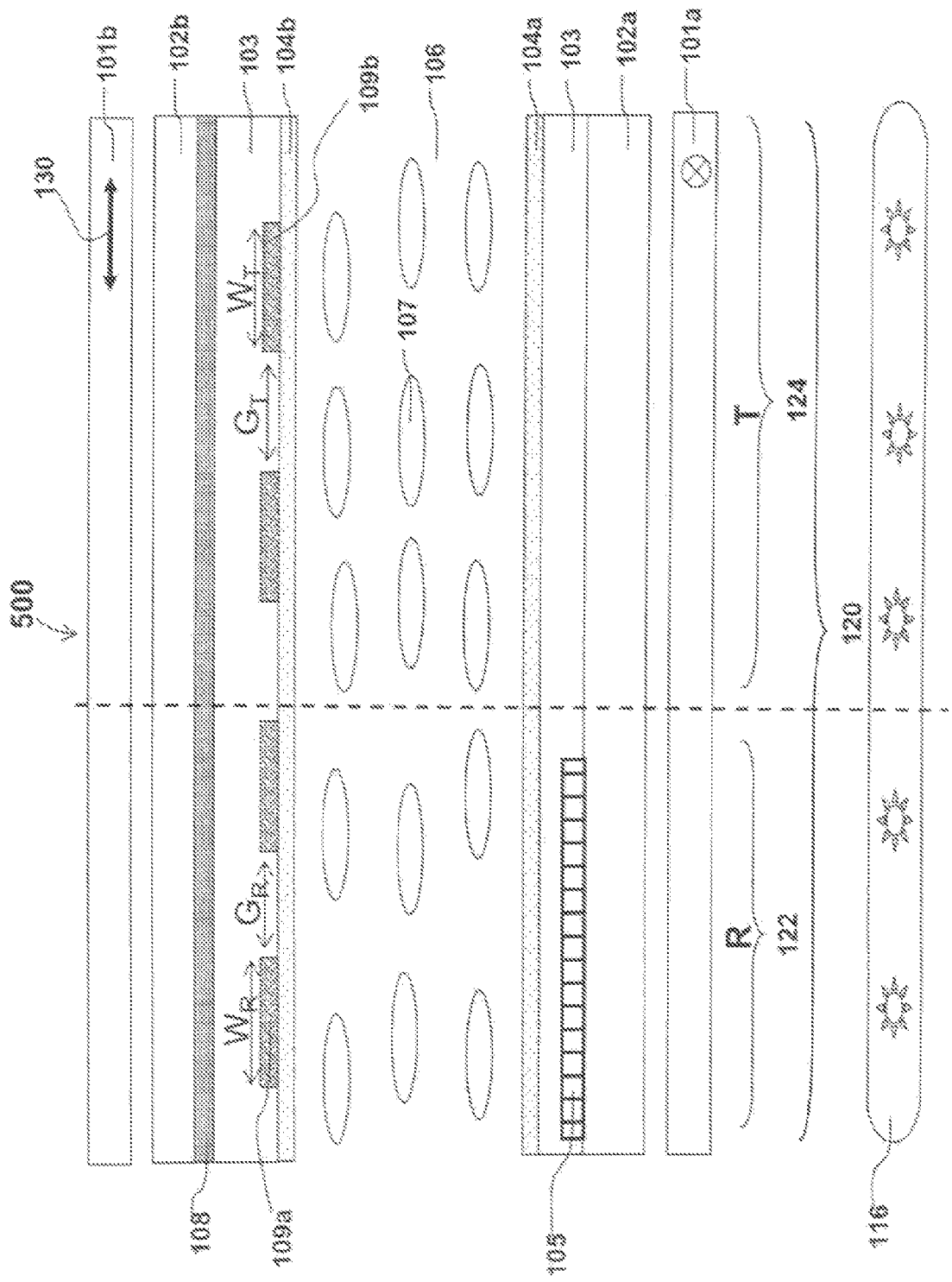

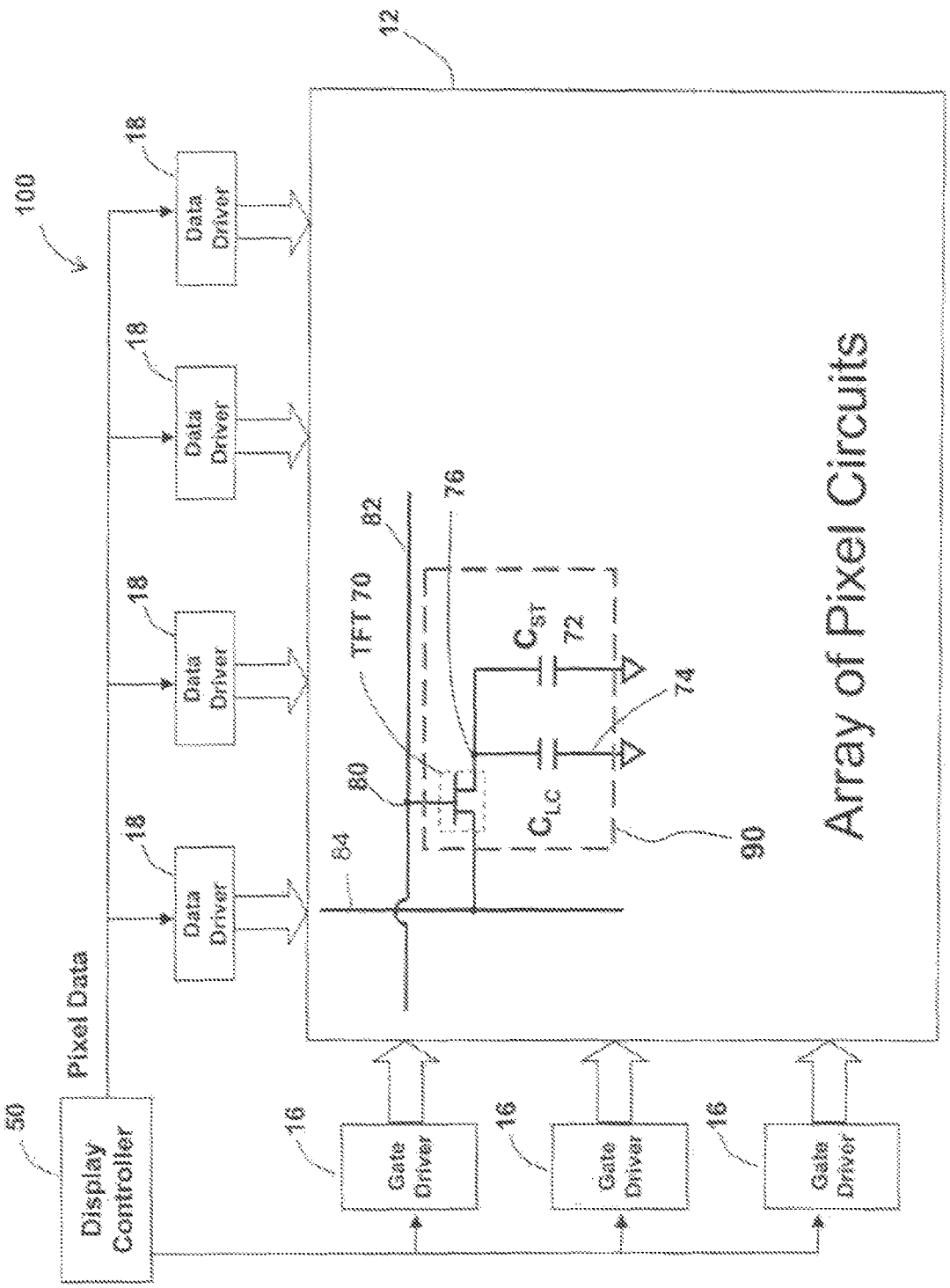

WIDE VIEWING ANGLE TRANSFLECTIVE LIQUID CRYSTAL DISPLAYS

FIELD OF THE INVENTION

The present invention is related to a liquid crystal display (LCD), and more particularly to apparatus, methods, systems and devices for a high light efficiency, wide viewing angle transflective liquid crystal display using a polarization dependent reflector as a means of reflecting light and an initially homogeneous aligned liquid crystal cell for the wide viewing angle transmissive mode for application requiring high light efficiency and low power consumption, and versatility for different ambient light conditions.

BACKGROUND AND PRIOR ART

Liquid crystal displays have been widely used in various mobile devices, owing to its high image quality, compact size, and light weight. In those devices, such as in cell phones and personal digit assistants (PDAs), a pure transmissive (T) typed LCD that exhibits a high contrast ratio and good color saturation is usually employed. However, the pure T type LCD has a poor outdoor readability because its image is washed out by strong ambient lights, such as sunlight, which makes it imperfect for devices that require frequency outdoor applications. Besides, its dependence on a backlight causes a relatively high power consumption, which further reduces the working time for each battery change. On the other hand, a reflective (R) type LCD does not require a backlight unit and uses the ambient light for displaying images instead. As a result the display's power consumption is low and has a good outdoor readability, making it uniquely useful for certain environments. However, the unavoidable surface reflection inherent in R type devices result in an inferior contrast and color saturation as compared to the T mode LCDs.

To overcome abovementioned problems of both the transmissive mode and reflective mode displays in mobile device applications, the transflective typed LCD combines both T and R type LCDs into one display to obtain environment-versatility, good image quality, and low power consumption. A transflective type LCD can operate in a transmissive mode and/or a reflective mode. In one example, each pixel of the transflective LCD is divided into a T sub-pixel and a R sub-pixel, and the cell gap of the T ($d_T$) and R ($d_R$) regions are different ($d_T \sim 2 d_R$) for maximum light efficiency as described in U.S. Pat. No. 6,341,002 issued to Shimizu et al. on Jan. 22, 2002.

However, besides the light efficiency, another critical issue in abovementioned kind of display in its dependence on a broadband circular polarizer. As shown in FIG. 1a, a typical broadband circular polarizer 10 in most prior art transflective LCDs consists of one linear polarizer along with one mono-chromatic half-wave plate and one mono-chromatic quarter-wave plate under a special alignment as described by S. Pancharatnam ("Achromatic combinations of birefringent plates: part I. An achromatic circular polarizer," in Proc. Indian Academy of Science, vol. 41, sec. A, (1955), pp. 130-136. The mono-chromatic half-wave plate has its optics axis set at 15 degrees with respect to the transmission axis of the top polarizer, and the mono-chromatic quarter-wave plate has its optics axis set at 75 degrees with respect to the transmission axis of the polarizer. Because of the existence of the broadband quarter-wave plate above the LC cell for R mode, the T mode requires another circular polarizer to be set below the LC cell to achieve a common dark state as in the R mode.

A problem with this configuration is that the viewing angle of the transflective LCDs is quite narrow.

FIG. 1b is a graph 20 that shows the simulated light leakage of two stacked circular polarizers, in which the light leakages at different viewing angles, both azimuthal and polar directions are calculated correspondingly. The calculated results are normalized to its maximum possible output value between two parallel aligned linear polarizers in the normal direction. As shown in FIG. 1b, the light leakage of two stacked broadband circular polarizers is severe at off-axis, e.g., the approximately 10% light leakage occurs within a cone at 40 degrees, which means the 10:1 contrast ratio of two stacked circular polarizers is limited to approximately 40 degrees. However, the corresponding angular light leakage for two crossed linear polarizers is much less as shown in the graph 30 in FIG. 1c. The 10% light leakage is well suppressed to over 80 degrees, and 1% light leakage is over 50 degrees.

What is needed to solve these problems is a transflective structure with a high light efficiency, good gray scale overlap between T and R modes, but no dependence on the above-mentioned circular polarizer. In addition, a single cell gap structure for the purpose of simple fabrication and good yield is also of great interest to those skilled in the art.

SUMMARY OF THE INVENTION

A primary object of the invention is to provide new methods, systems, apparatus and devices for an apparatus, methods, systems and devices for a transflective liquid crystal display device that can have wide viewing angle and are not dependent on the circular polarizers.

A secondary objective of the invention is to provide new methods, systems, apparatus and devices for a transflective liquid crystal display device that can has a single cell gap for easy fabrication but with high light efficiency for both T and R modes, and can be driven by a single driving gamma curve for both T and R modes.

According to one aspect of the present invention, a liquid crystal display including a first and a second substrate have plural pixels defined therebetween; the first and second substrates have polarizing layer on an exterior surface and a single cell gap liquid crystal layer and alignment layers interposed between their inner surfaces, wherein the liquid crystal molecules are homogeneously aligned by the surface alignment layer; within each pixel, the liquid crystal display have a reflective region and a transmissive region, wherein a polarization dependent reflector, such as a wire grid polarizer is formed in the reflective region working as a means of reflecting the ambient light in displaying the images for the reflective mode, and the light from the backlight unit is employed to display the images in the transmissive mode, but no broadband quarter-wave plates are used in the transmissive region; besides at least one transparent electrode as the common electrode is formed on one of the substrate and at least one transparent electrode as the pixel electrode are formed on the same the substrate, wherein substantial horizontal electric fields are generated to rotate the liquid crystal molecules in a direction substantially parallel to the substrate surface when a driving voltage from the data line is applied to the pixel electrodes.

Further objects and advantages of this invention will be apparent from the following detailed description of preferred embodiments which are illustrated schematically in the accompanying drawings.

BRIEF DESCRIPTION OF THE FIGURES

FIG. 1a is the structure of a broadband circular polarizer.

FIG. 13 is a cross-section of the structure of the present TRLCD invention with different electrode width W and gap G values in the T and R regions.

FIG. 15a is the viewing angle of the T mode in the structure of FIG. 14a.

FIG. 16a is the color shift of the T mode in the structure of FIG. 14a.

FIG. 20 is a schematic diagram of a liquid crystal display 100 according to the present invention.

DESCRIPTION OF THE PREFERRED EMBODIMENTS

Figure 1B:
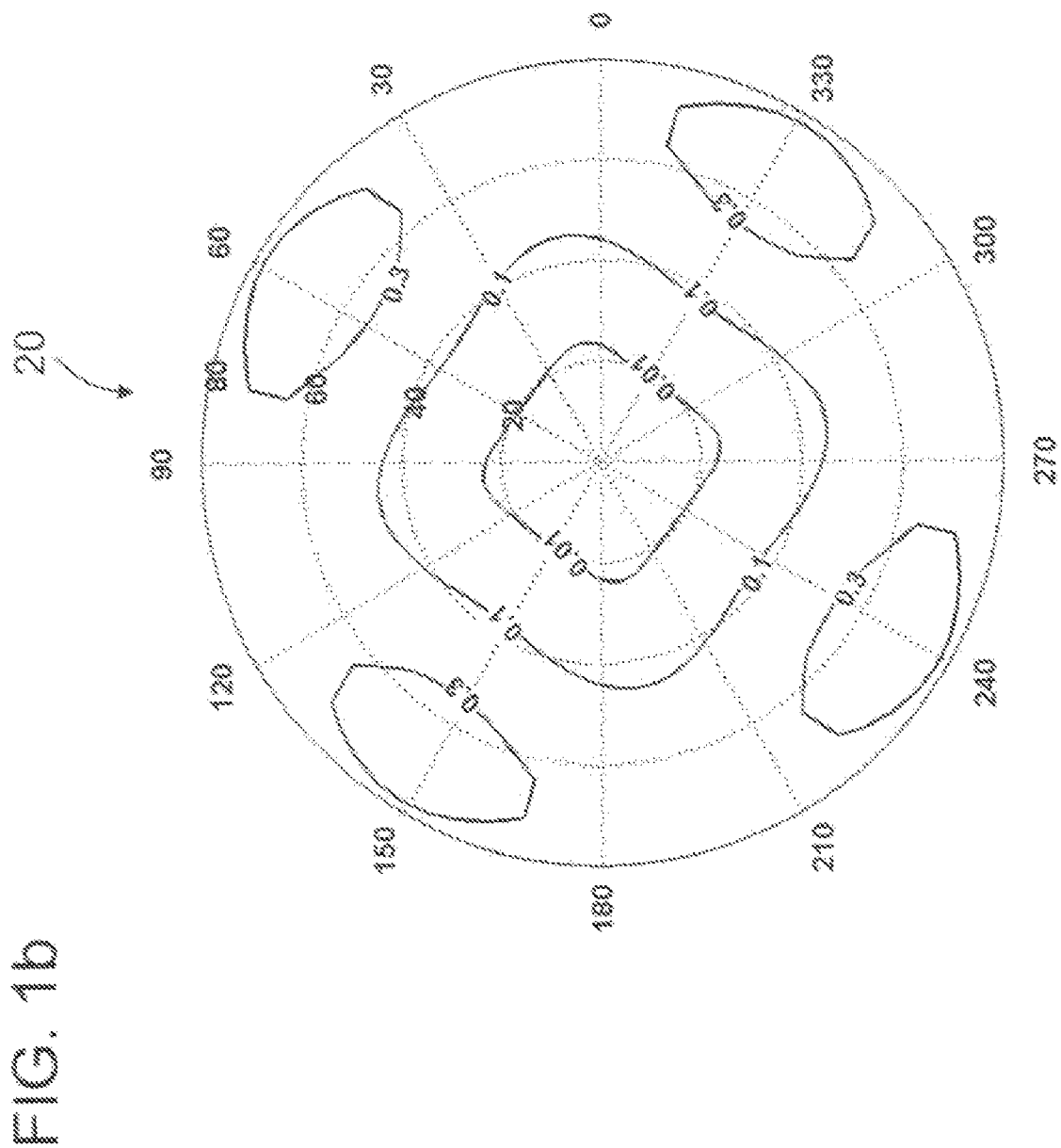
FIG. 1b is the angular dependent light leakage of two stacked broadband circular polarizers.
Figure 1C:
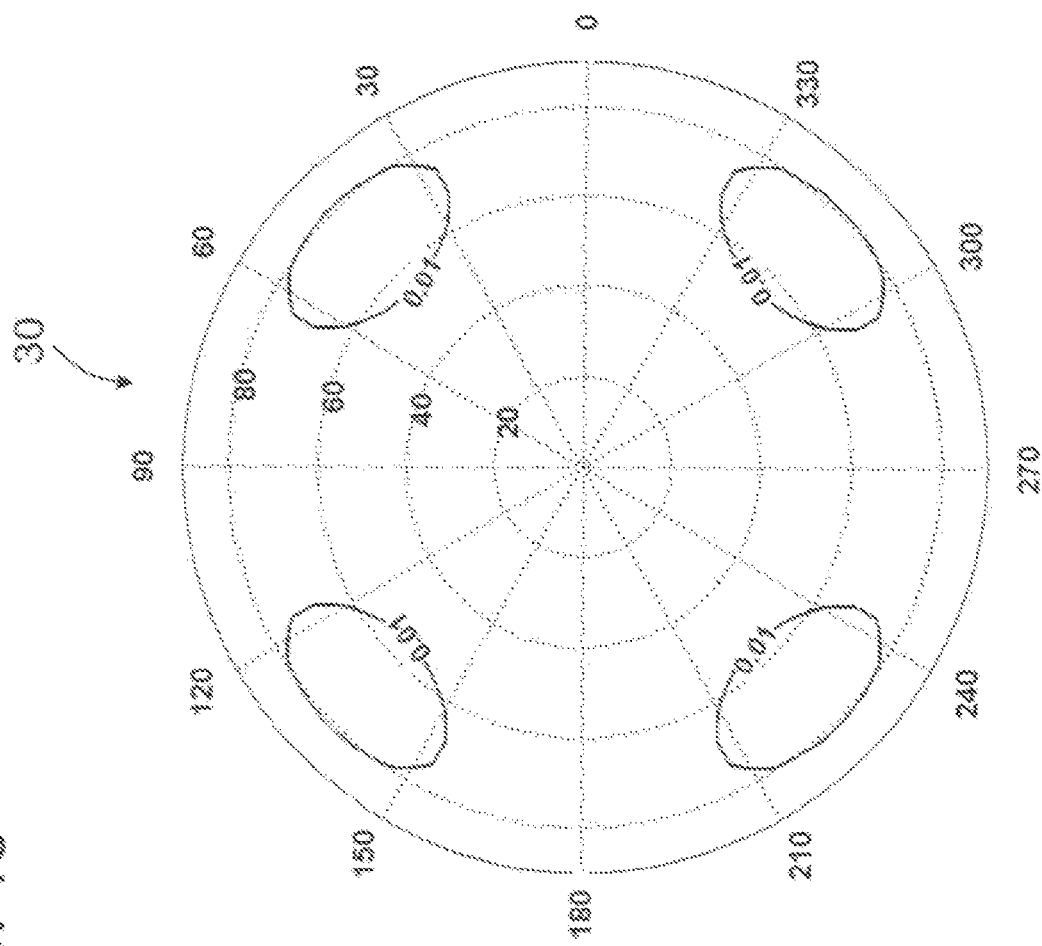
FIG. 1c is the angular dependent light leakage of two crossed linear polarizers.

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of reference numerals used in the figures and description to identify element of the present invention.

Figure 2:
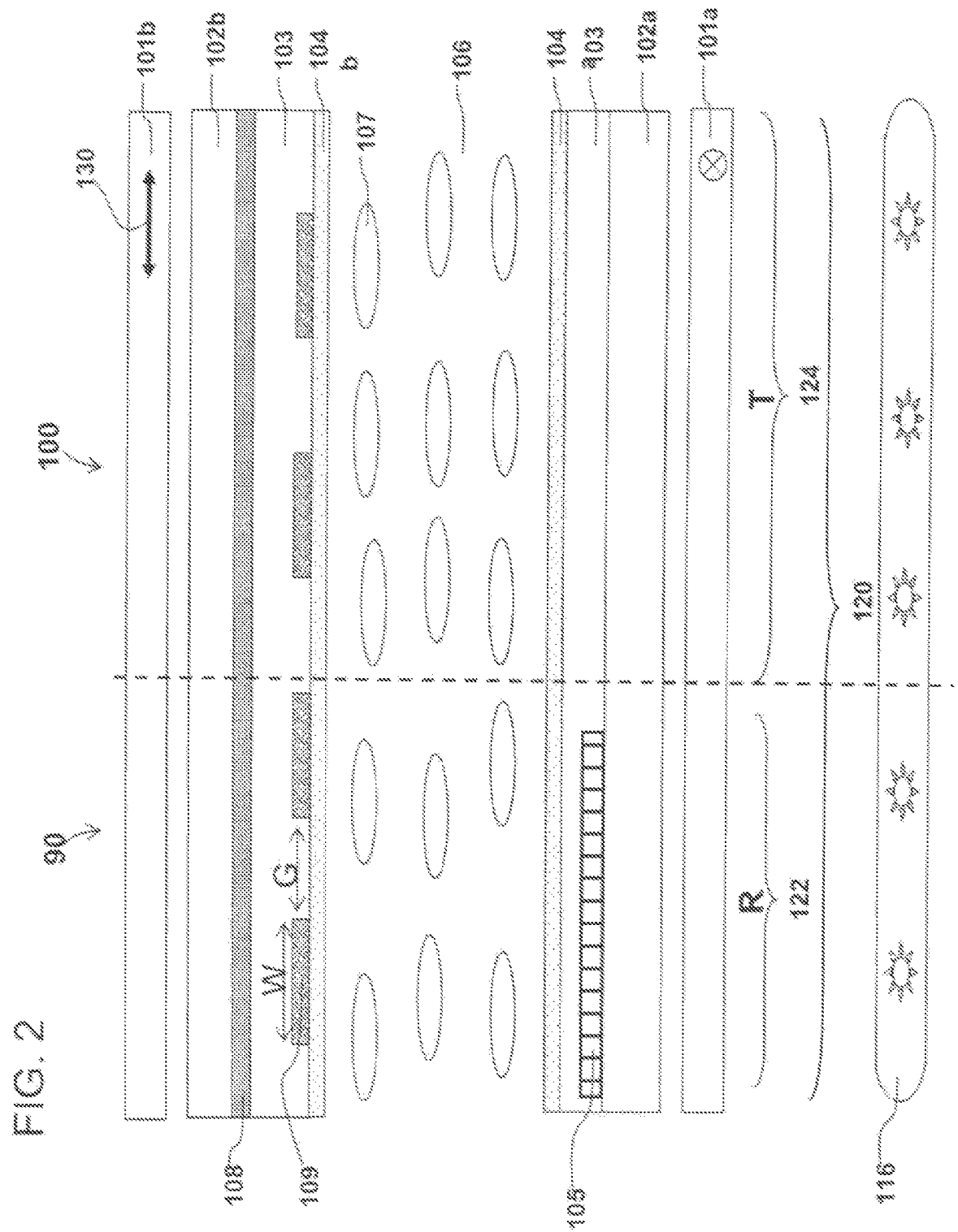
FIG. 2 is a cross-sectional diagram of a pixel.

10 Broadband circular polarizer
12 array of pixel circuits
16 gate driver
18 data driver
20 circular polarizer leakage
30 linear polarizer leakage
50 display controller
70 thin film transistor
72 storage capacitor
74 LC capacitor
76 TFT drain
80 TFT gate
82 gate line
84 data line
90 pixel
transflective LCD
101a crossed linear polarizer
101b crossed linear polarizer
102a substrate
102b substrate
103 insulation layer
104a alignment layer
104b alignment layer
105 polarization dependent reflector
106 liquid crystal layer
107 LC molecules
108 common electrode
109 pixel electrode strips
109a electrode strip in reflective region
109b electrode strip in transmissive region
110 transflective LCD
116 backlight
118 incident backlight
120 pixel
122 reflective region
124 transmissive region
130 transmission axis
140 incident ambient light
150 transmitted ambient light
160 transmitted backlight
170 reflected ambient light
208 common electrode
209 pixel electrode
220 metal strips
222 incident light
224 first component of the light
226 second component of the light
230 lengthwise direction
320 gate line 320
330 thin film transistor
340 data line
350 lengthwise strip direction 400 voltage dependent T and R curves
402 voltage dependent T curve
404 voltage dependent R curve
410 voltage dependent T and R curves
412 voltage dependent T curve
414 voltage dependent R curve
415 voltage dependent T and R curves
417 voltage dependent R curve
419 voltage dependent T curve
420 voltage dependent T and R curves
422 voltage dependent T curve
424 voltage dependent R curve
430 voltage dependent T and R curves
432 voltage dependent T curve
434 voltage dependent R curve
440 voltage dependent T and R curves
442 voltage dependent T curve
444 voltage dependent R curve
450 voltage dependent T and R curves
452 voltage dependent T curve
454 voltage dependent R curve
500 pixel
540 voltage dependent T and R curves
542 voltage dependent T curve
544 voltage dependent R curve
550 voltage dependent T and R curves
552 voltage dependent T curve
554 voltage dependent R curve
560 iso-contrast plot
570 iso-contrast plot
580 color shift plot
590 color shift plot
600 color shift plot
610 color shift plot
650 pixel FIG. 2 is cross-sectional diagram of an example of a pixel 90 of a transflective liquid crystal display 100. In the display 100, the liquid crystal layer 106 is sandwiched between the bottom substrate 102a and the top substrate 102b, which together are further interposed between two crossed linear polarizers 101a and 101b. The liquid crystal molecules are initially homogeneously aligned by the surface alignment layers 104a and 104b. A first transparent plane electrode layer 108 is formed on the top substrate 102b as the common electrode; a group of second transparent electrode strips 109 with a width W and a gap G between adjacent strips are formed on the substrate 102b as the pixel electrodes 109, wherein the common 108 and pixel 109 electrodes are insulated by a passivation layer 103 such as silicon oxide ($SiO_2$) or silicon nitride ($Si_3N_4$) formed therebetween. Each pixel 120 of the display 100 is divided into a reflective region 122 and a transmissive region 124. In the reflective region 122, a polarization dependent reflector such as a wire grid polarizer 105 is formed on the bottom substrate 102a as a means of reflecting the ambient light incident from the top polarizer 101b. In the transmissive region 124, the light from the backlight unit 116 transmits the bottom polarizer 101a and modulated by the LC layer to displays the image.

Figure 3:
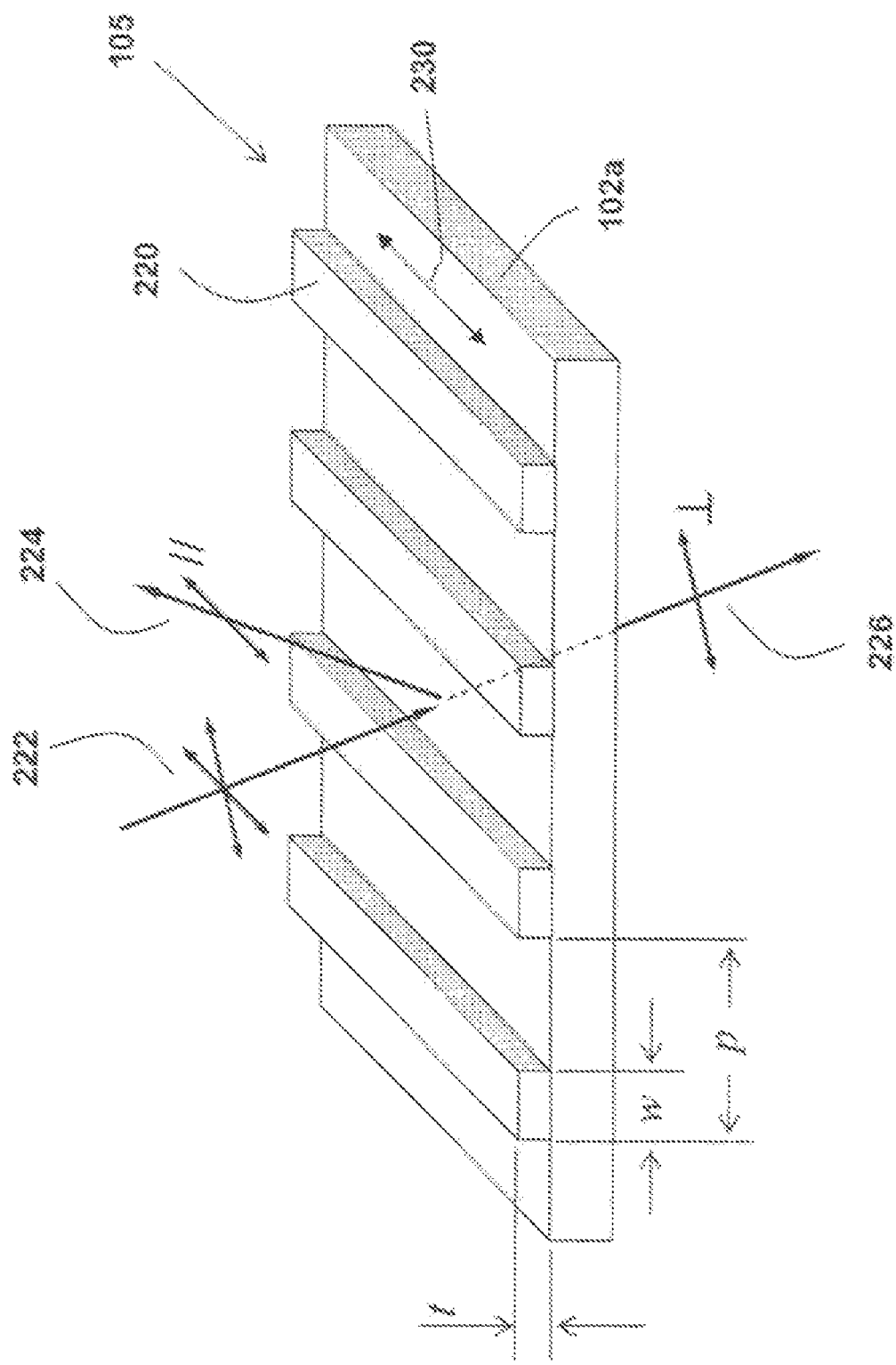
FIG. 3 is the structure of a wire grid polarizer.

As shown in FIG. 3, the wire grid polarizer (WGP) 105 includes metal strips 220 formed on the lower substrate 102a. The metal strips 220 extend along the direction 230 referred to as the lengthwise direction of the metal strips 220. The wire grid polarizer 105 has a transmission axis that is perpendicular to the lengthwise 230 of the metal strips 220 and a reflection axis that is parallel to the lengthwise direction 230 of the metal strips 220. When an unpolarized incident light 222 impinges on the surface of the wire grid polarizer 105, a first component of the light 224 having a polarization parallel to the lengthwise direction of the metal strips 220 is reflected, and a second component of the light 226 having a polarization perpendicular to the metal strips passes through the wire grid polarizer 105.

Figure 4:
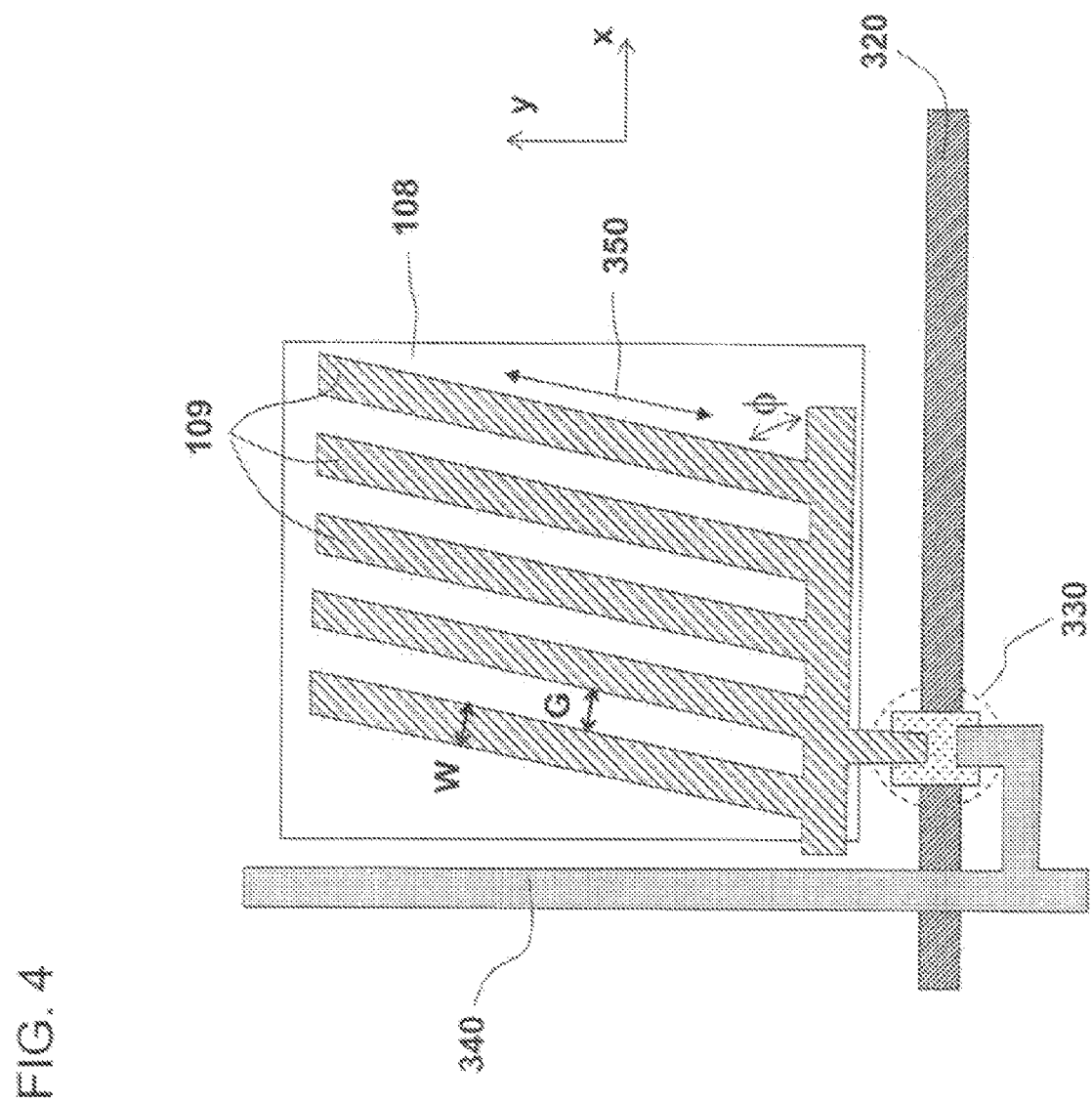
FIG. 4 is the top view of the strip electrode structure.

FIG. 4 is a top view of the plane common electrode and the strip-shaped pixel electrodes of pixel 90, where an x-y coordinate is defined as a reference. As shown, the x-axis is a reference direction set along the transmission axis 130 shown in FIG. 2 of the top polarizer 101b. The common electrode 108 is a transparent plane electrode and the pixel electrodes 109 are strip-shaped with a width W and a gap G and the lengthwise strip direction 350 is set at an angle $\phi$ with respect to the x-axis. The pixel is controlled by the thin-film-transistor (TFT) 330. When the TFT 330 is turned on by the signal from the gate line 320, the voltage from the data line 340 is applied to the pixel electrodes 109 to rotate the liquid crystal molecules.

Figure 5:
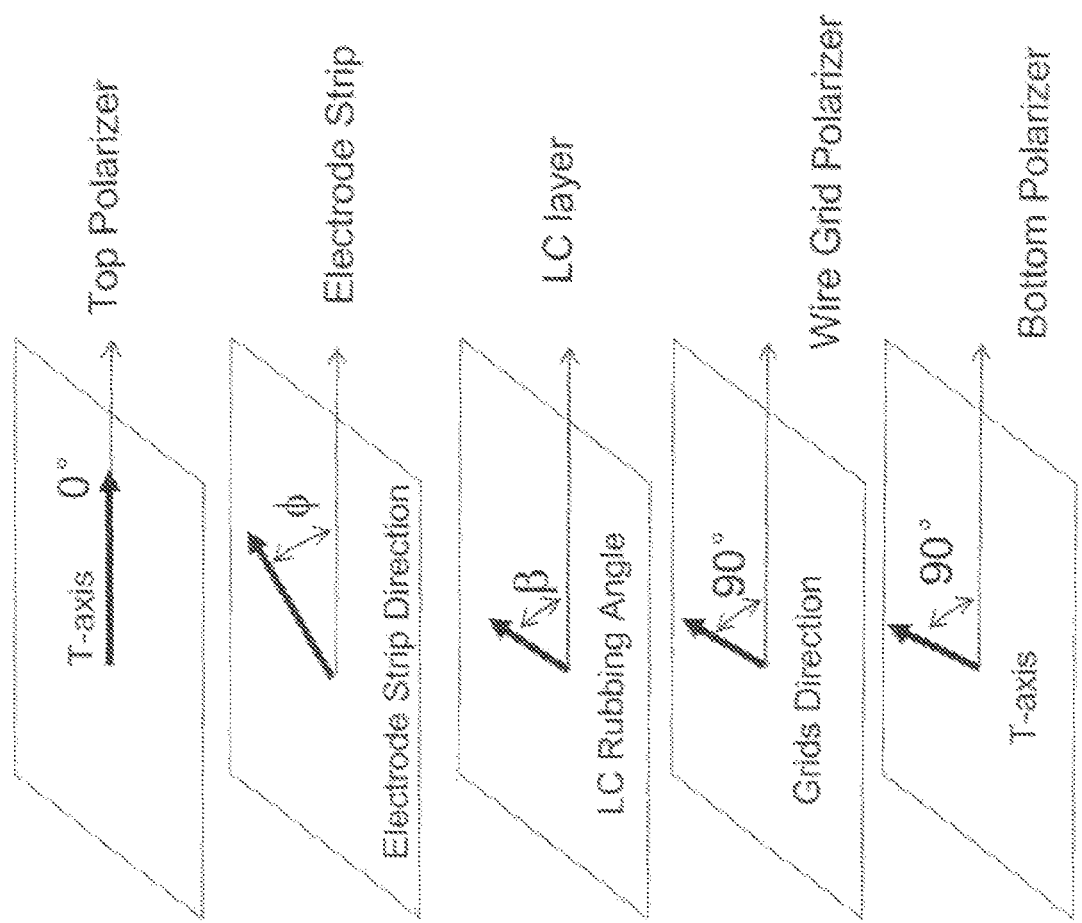
FIG. 5 is the optic axis alignment of each layer of the display.

The optic axes of the each layer and the electrode strip orientation show in FIG. 2 are shown in FIG. 5. As previously described, the transmission axis 130 of the top polarizer 101b is taken as the reference direction. The transmission axis of the bottom polarizer 101a is set at a direction perpendicular to that of the top polarizer 101b. The lengthwise direction 230 of the wire grids 220, which is also the reflective axis of the wire gird polarizer 105, is set perpendicular to the transmission axis 130 of the top polarizer 101b.

The liquid crystal layer 106 is rubbed in a direction $\beta$ with respect to the reference direction 130 and the electrode strip direction 350 of the pixel electrodes 109 has an angle $\phi$ with respect to the reference transmission axis 130 of the top polarizer. The angle $\beta$ can have two values: parallel or perpendicular to the reference direction 130. The specific value of the angle $\phi$ is based on the LC material used in this design and the rubbing direction $\beta$. More specifically, the absolute value $|\phi-\beta|$ should be within a range of approximately 0° and 45°, when a positive dielectric anisotropy ($\Delta\in$) material is used, and it should be within a range of approximately 45° and 90°, when a negative $\Delta\in$ material is used. For example, when the rubbing direction angle $\beta$ is set at approximately 0° with respect to the transmission axis of the top polarizer and a positive $\Delta\in$ material is used, the value of the angle $\phi$ should be set between approximately 0° and approximately 45°. On the other hand, when a negative $\Delta\in$ LC material is used with $\beta=0°$, the angle $\phi$ is set between approximately 45° and approximately 90°. Correspondingly, when the angle $\beta$ is set at 90°, the angle $\phi$ is set between approximately 0° and approximately 45° when a negative $\Delta\in$ LC material is used, and be set between approximately 45° and approximately 90° when a positive $\Delta\in$ LC material is used.

Figure 6:
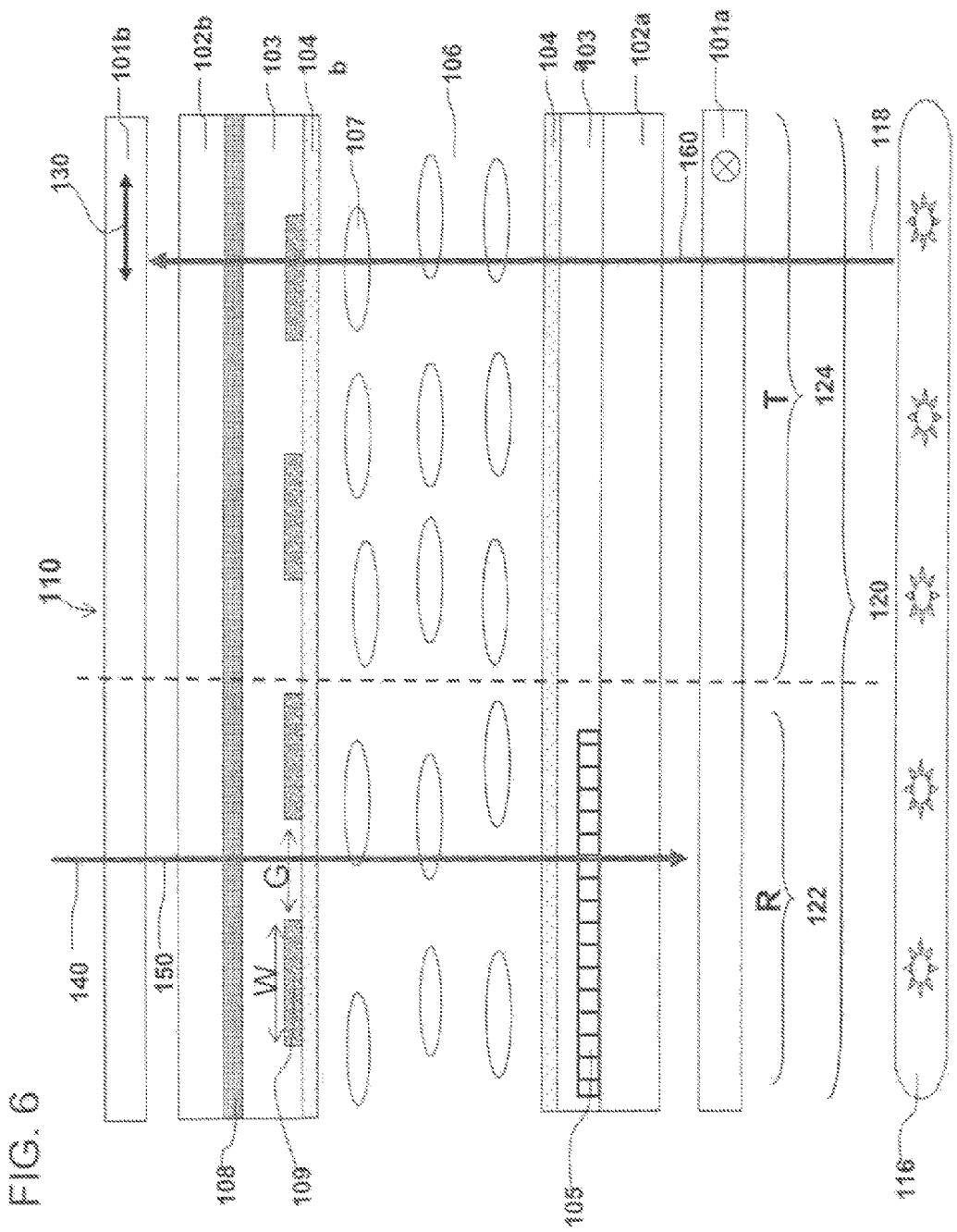
FIG. 6 is the dark state for the display without applied voltage.

Operationally, when no voltage is applied to pixel electrode 109 as shown in the display 110 in FIG. 6, the LC molecules 107 are initially homogeneously aligned. For the transmissive (T) region 124 of the pixel at the voltage-off state, the light 118 that transmits the bottom polarizer 101a has polarization perpendicular to the transmission axis 130 of the top polarizer 101b. Because the liquid crystal layer has a rubbing direction either parallel ($\beta=0°$) or perpendicular ($\beta=90°$) to the transmission axis 130, that transmitted backlight 160 maintains its polarization state when passing through the LC layer, and is blocked by the top crossed polarizer 101b on the top substrate 102b. For the reflective (R) region 122 of the pixel at the voltage-off state, the incident ambient light 140 passes the top polarizer first to have a polarization parallel to the transmission axis 130, then the transmitted incident light 150 experiences negligible phase retardation after passing through the LC layer. Because the reflective axis of the WGP 105 is set at perpendicular to the transmission axis 130, the ambient light passes through the WGP 105 and is blocked by the bottom polarizer 101*a*. Thus, at the voltage-off state, both the T and R regions are in a common dark state.

Figure 7:
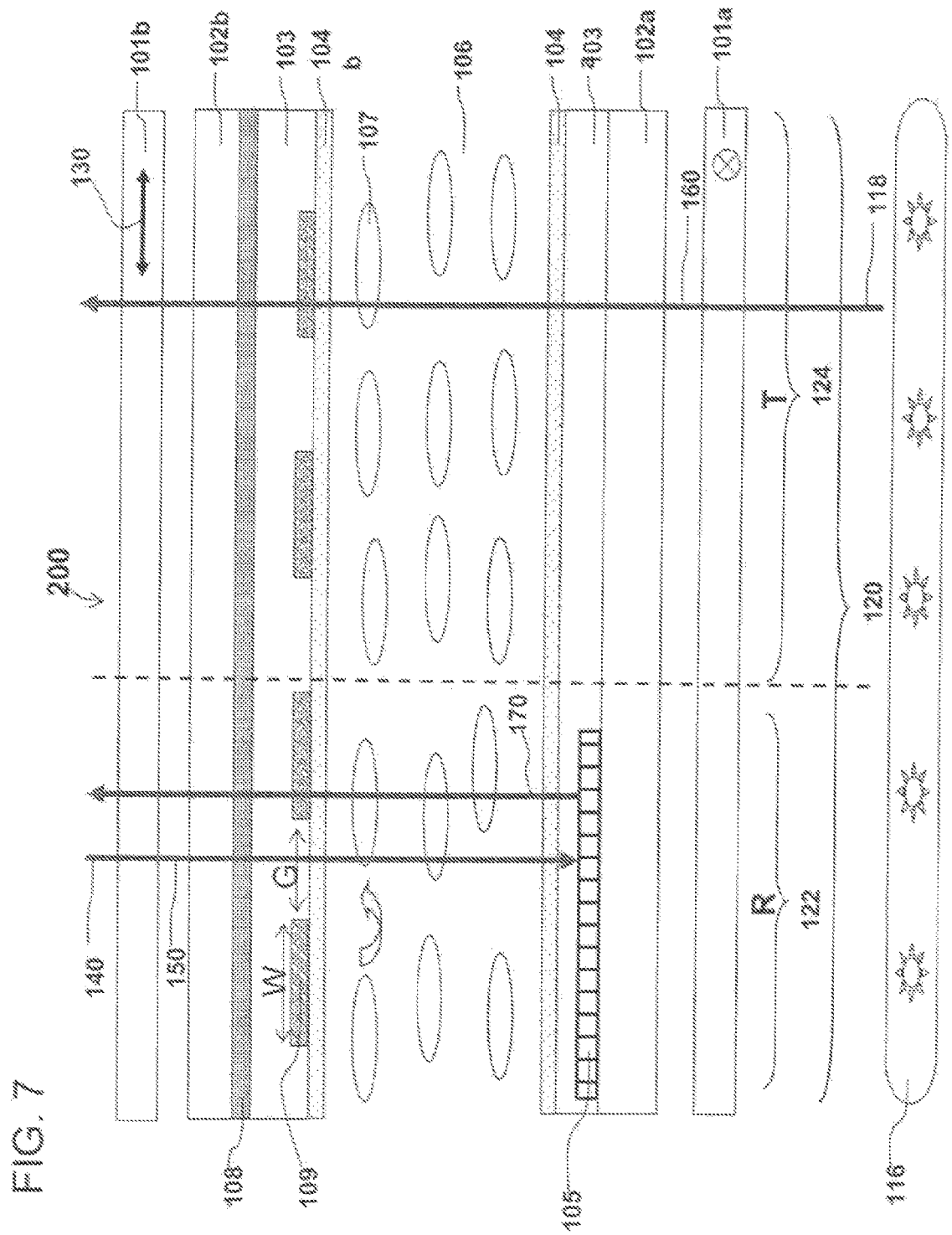
FIG. 7 is the bright state for the display with applied voltage.

When a high voltage, above the threshold voltage, is applied to the pixel electrode 109, (the threshold voltage is a voltage below which the perturbation of liquid crystal molecule orientations is negligible with respect to the initial state when no pixel voltage is applied,) in the LC display 200 shown in FIG. 7, the LC molecules are rotated by the electric fields generated from the pixel 109 and common 108 electrodes. Therefore the new average optic axis of the LC layer changes to a new angle. When the phase retardation value $d\Delta n$, where d is cell gap of the LC layer, $\Delta n$ equals $n_e - n_o$, where $n_e$ and $n_o$ are the extraordinary and ordinary refractive indices, respectively, of the liquid crystal material, is equal to approximately half-wave plate, the LC layer functions like a polarization rotator for the light passing through it. In this example, for the transmissive region 124 of the pixel at a voltage-on state, the incident light 118 from the backlight 116 first has a polarization state that is parallel to the transmission axis of the bottom polarizer 101*a* and the transmitted backlight 160 further passes through the LC layer.

If the new average optic axis of the LC layer is rotated by 45° away from its initial rubbing direction, the LC layer rotates the polarization of the transmitted backlight 160 from the bottom polarizer by an angle of 90°, thus the transmitted backlight 160 light transmits through the top polarizer 101*b* and is seen by the viewer. For the reflective region 122 of the pixel 120 at a voltage-on state, the incident ambient light 140 passes the top polarizer 101*b* and the transmitted ambient light 150 has a polarization parallel to the transmission axis 130. The polarization direction of the transmitted ambient light 150 is first rotated approximately 90° by the LC layer before it impinges on the WGP surface 105, thus the transmitted ambient light 150 is parallel to the reflective direction 230 of the WGP 150, and is reflected back through the LC layer as reflected ambient light 170. After the reflected ambient light 170 passes the LC layer, its polarization direction experiences another 90° rotation to a direction parallel to the transmission axis 130 and then transmits through the top polarizer 101*b* to the viewer. A common bright state is achieved for both the T and R modes.

As an example in accordance with the LC display structure 100 shown in FIG. 2, a negative LC material, such as MLC-6608 from Merck, is taken in this structure with its parallel dielectric constant $\in_{11}=3.6$, perpendicular one $\in_1=7.8$, elastic constants $K_{11}=16.7$ pN, $K_{33}=18.1$ pN, extraordinary refractive index ne=1.5578, and ordinary refractive index no=1.4748 at lambda=589 nm. In this example, the liquid crystal layer has a cell gap of approximately 4 μm, and the electrode width W of approximately 3 μm and the gap between adjacent electrode strips is approximately 4 μm. The rubbing direction β of the LC layer is set at approximately 0° with respect to the transmission axis 130 of the top polarizer 101*b* and the electrode strip direction φ is at an angle of approximately 80° to gain maximum light efficiency. The angles are almost equivalent to the example with β=90° and φ=10°.

Figure 8A:
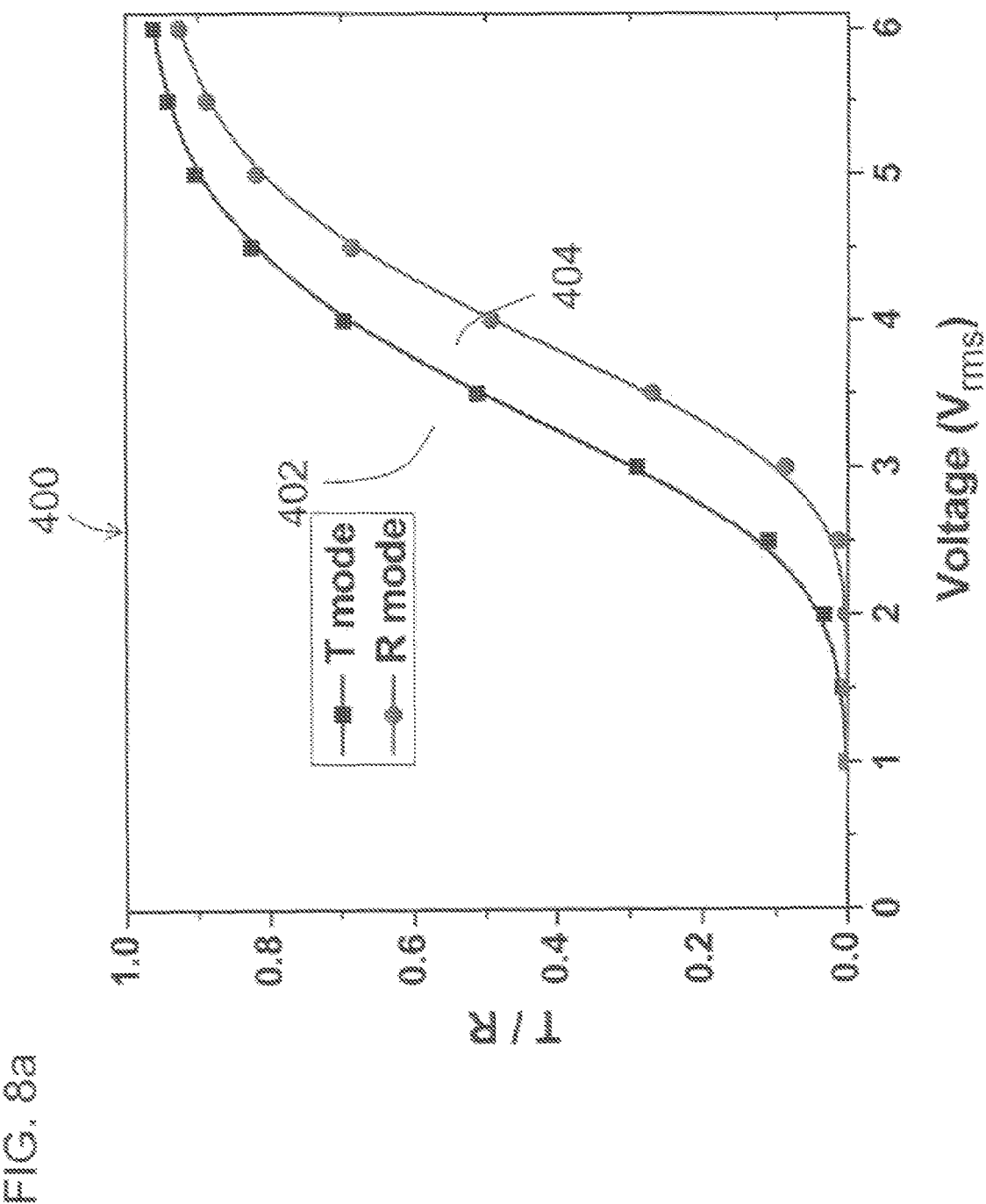
FIG. 8a is the VT and VR curves of the display with a negative LC material and electrode width W=3 μm, G=4 μm, and electrode angle ϕ=80°.

FIG. 8*a* is a graph 400 showing the simulated voltage-dependent efficiency curves for original voltage/transmission (VT) curve, original voltage/reflection (VR) curve. As shown in FIG. 8*a*, both the voltage-transmissive (VT) curve 402 and the voltage-reflective (VR) curve 404 share a common dark state and reach above approximately 90% of the maximum possible light efficiency at V=6 Vrms.

Figure 8B:
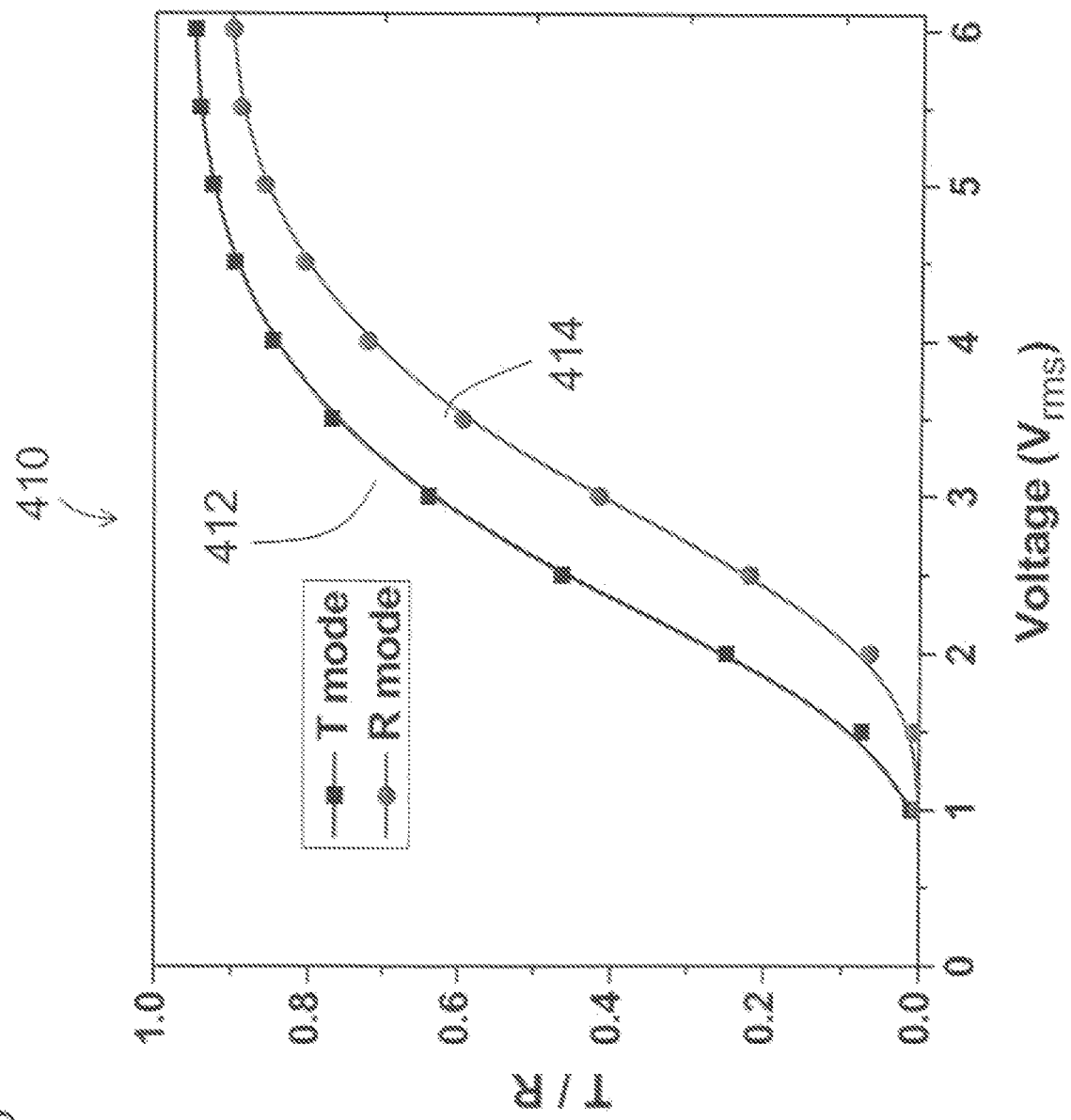
FIG. 8b is the VT and VR curves of the display with a positive LC material and electrode width W=2 μm, G=3 μm, and electrode angle ϕ=10°.

Correspondingly, the structure can also use a positive $\Delta\in$ LC material such as MLC-6686 from Merck with its parallel dielectric constant $\in_{11}=14.5$, perpendicular one $\in_1=4.5$, elastic constant $K_{11}=8.8$ pN, $K_{33}=14.6$ pN, extraordinary refractive index ne=1.5774, and ordinary refractive index no=1.4824 at lambda=589 nm. In this example, the liquid crystal layer has a cell gap of approximately 4 μm, and the electrode width W equal approximately 2 μm and the gap G between adjacent electrode strips is set at approximately 3 μm. When the rubbing direction β of the LC layer is set at approximately 0° with respect to the transmission axis 130 of the top polarizer 101*b*, then the electrode strip direction φ is at an angle of approximately 10° to gain maximum light efficiency. The graph 410 shown in FIG. 8*b* shows the simulated voltage-dependent efficiency curves for original VT curve and original VR curve. Similarly, both the VT curve 412 and VR curve 414 from graph 410 reaches over approximately 90% of the maximum possible light efficiency. Since the dielectric anisotropy $\Delta\in$ value of the positive material is much larger than that of the negative material, the on-state voltage of the cell using a positive LC material is also smaller than that of the negative cell.

Figure 9:
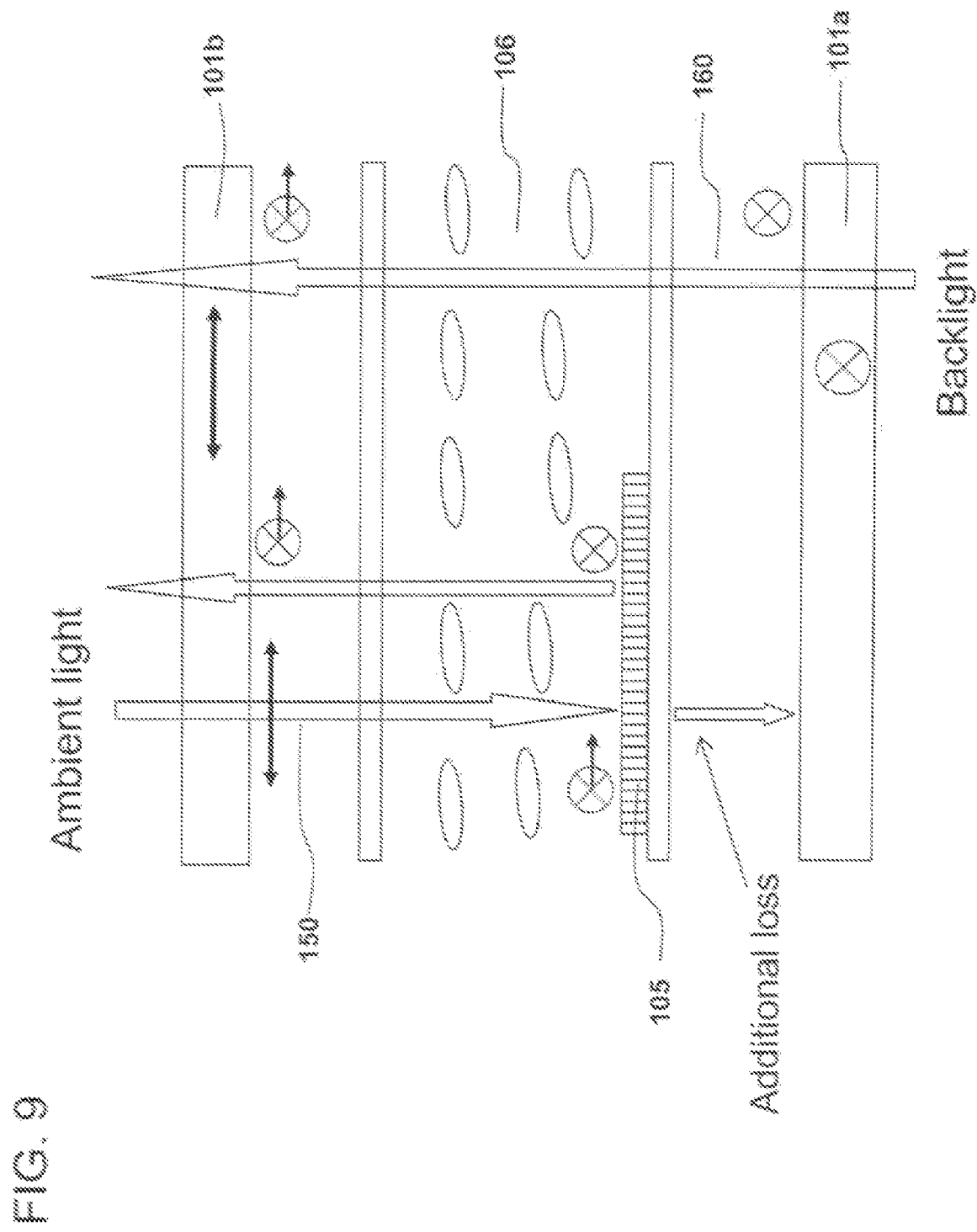
FIG. 9 is the diagram of additional loss from the WGP surface of the R mode at an intermediate gray-level.

However, for both cells using a positive dielectric anisotropy $\Delta\in$ and a negative dielectric anisotropy $\Delta\in$ LC material, VR is always lower than the corresponding VT value at each inter-mediate gray level. For example, in the example shown in FIG. 8*a*, the differences in the VR curve 404 and VT curve 402 is caused by the loss of light in the R sub-pixel 122 when the pixel voltage corresponds to a gray scale between the dark and bright states. Referring to FIG. 9, when the pixel voltage is at a level such that the rotation of the liquid crystal molecules 107 is less than approximately 45° from its original rubbing direction, the linearly polarized transmitted ambient light 150 has a polarization direction non-parallel to the reflective axis of the WGP 105 when the transmitted ambient light 150 reaches the surface of the wire grid polarizer dielectric anisotropy 105. A portion of the transmitted ambient light 150, the component of the light perpendicular to the metal stripes 220) passes the wire grid polarizer (WGP) 105 and is absorbed by the lower polarizer 101*a*. Thus, the amount of ambient transmitted light that is reflected by the wire grid polarizer 105 is less than the transmitted backlight 160 that passed through the linear polarizer 101*a*. This accounts for the lower luminance in the R sub-pixel region 122 compared to the T sub-pixel region 124 for a given pixel voltage. This additional loss from the WGP 105 surface results in VT and VR curves that deviate from each other as shown in FIGS. 8*a* and 8*b*.

As an estimation of the match or deviation between the VT and VR curves, the root-mean-square (RMS) value of the difference between the normalized T and R (normalization is in the reference to the maximum transmission of two stacked parallel linear polarizers) is introduced. Still referring to FIG. 8, for the VT and VR curves shown, when N=256 voltage points are sampled between gray-level 0 (wherein V=approximately 0.5 Vrms) and gray-level 255 (wherein V=approximately 6.0 Vrms), the RMS value of the difference between the T and R can be calculated by the following value $$\sqrt{\frac{\sum_{i=1}^{N}(T_i - R_i)^2}{N}}.$$

Figure 10:
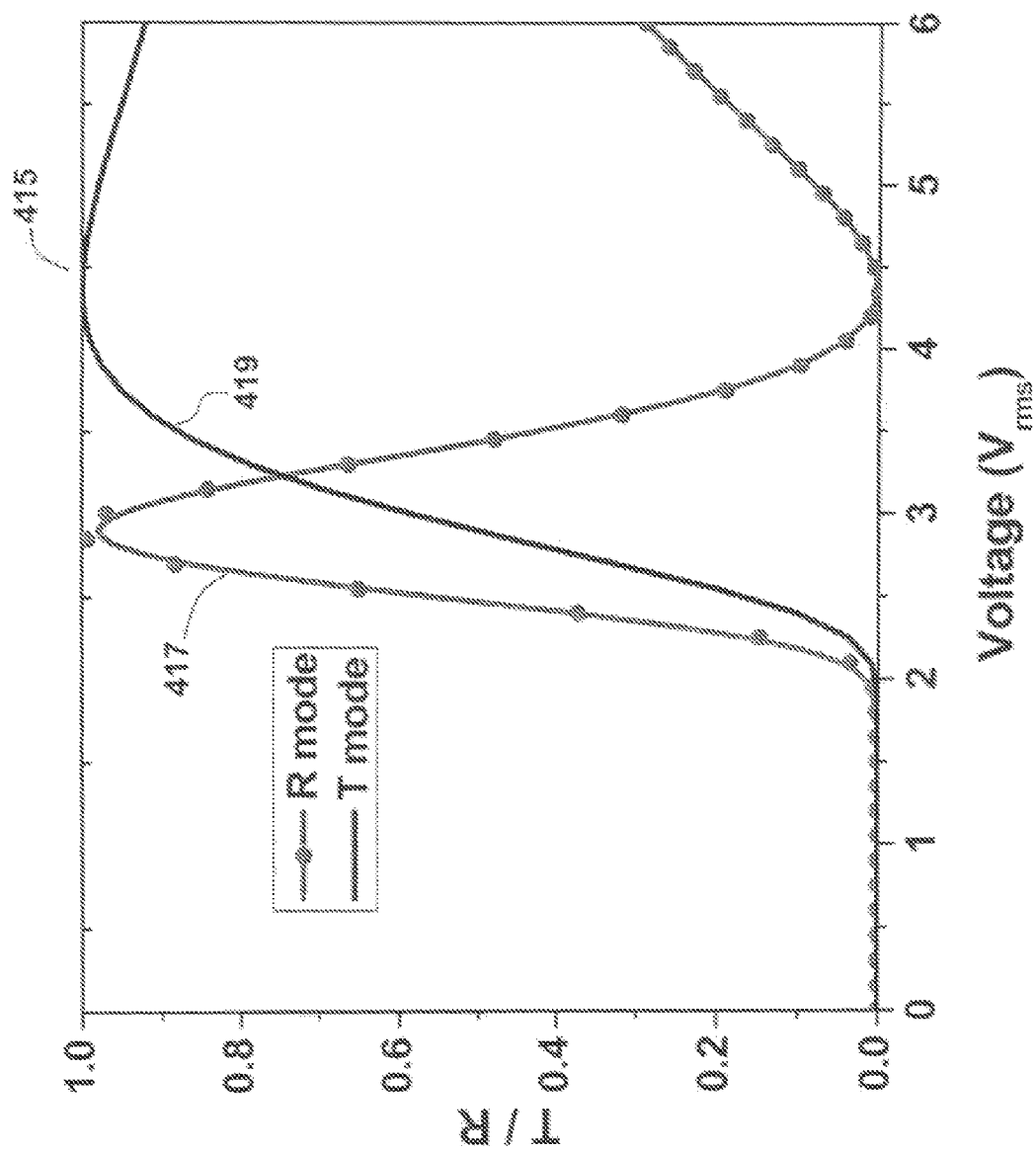
FIG. 10 is the VT and VR curves of the display with a single cell gap.

For the VT 402 and VR 404 curves shown in FIG. 8A, the RMS value is approximately 12.9%, and the RMS value for the VT and VR curves 412 and 414 shown in FIG. 8B is approximately 13.8%. Referring to FIG. 10 which is a plot for a transflective LCD using a single cell gap and a single driving circuit, the RMS value of difference between the VT curve 417 and VR curve 419 in graph 415 is approximately 31%, when V=approximately 1.5 Vrms is taken for gray level 0 and V=approximately 3.0 Vrms is taken for gray level 256.

Figure 11A:
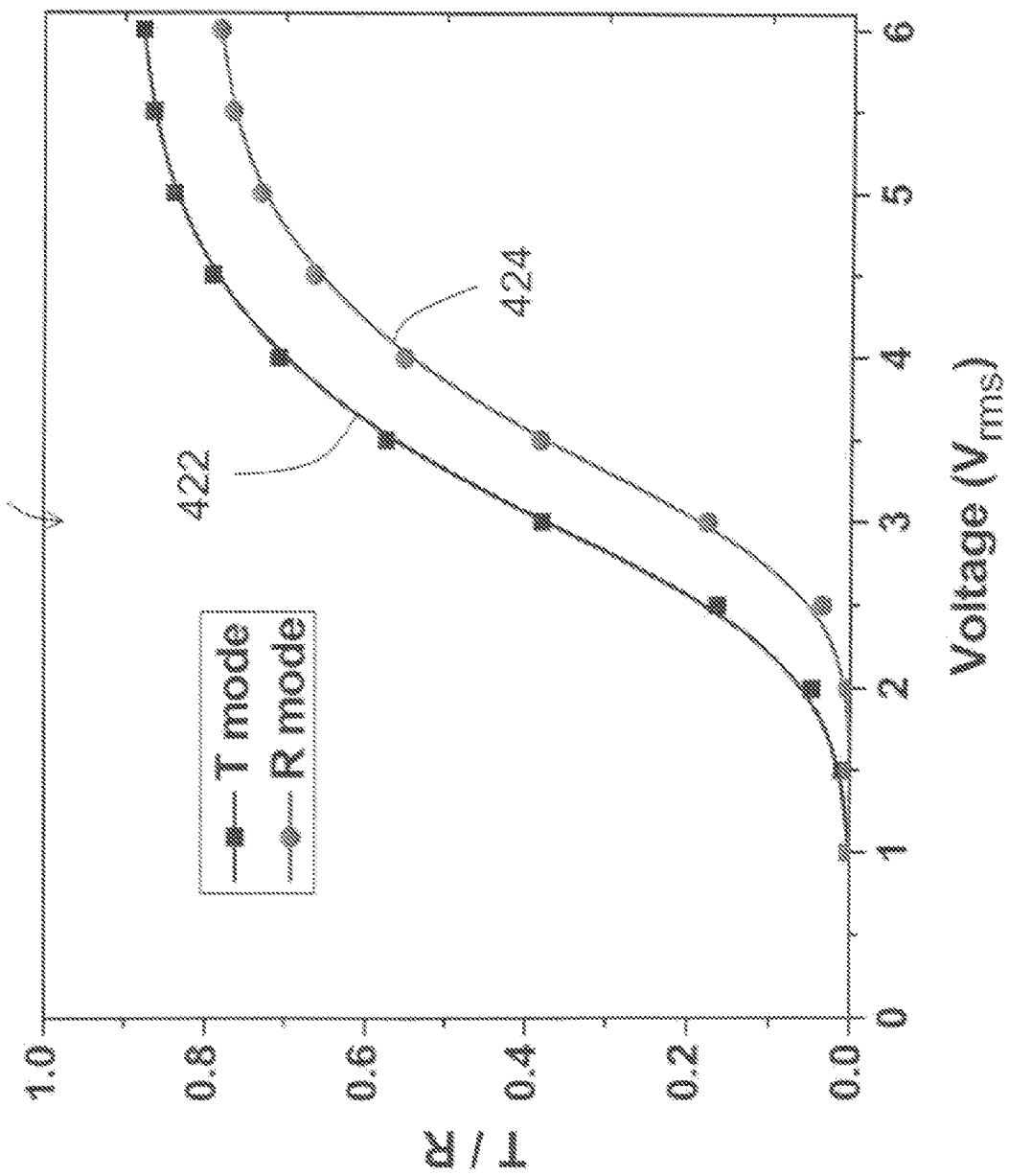
FIG. 11a is the VT and VR curves of the display with a negative LC material and electrode width W=3 μm, G=8 μm, and electrode angle ϕ=80°.
Figure 11B:
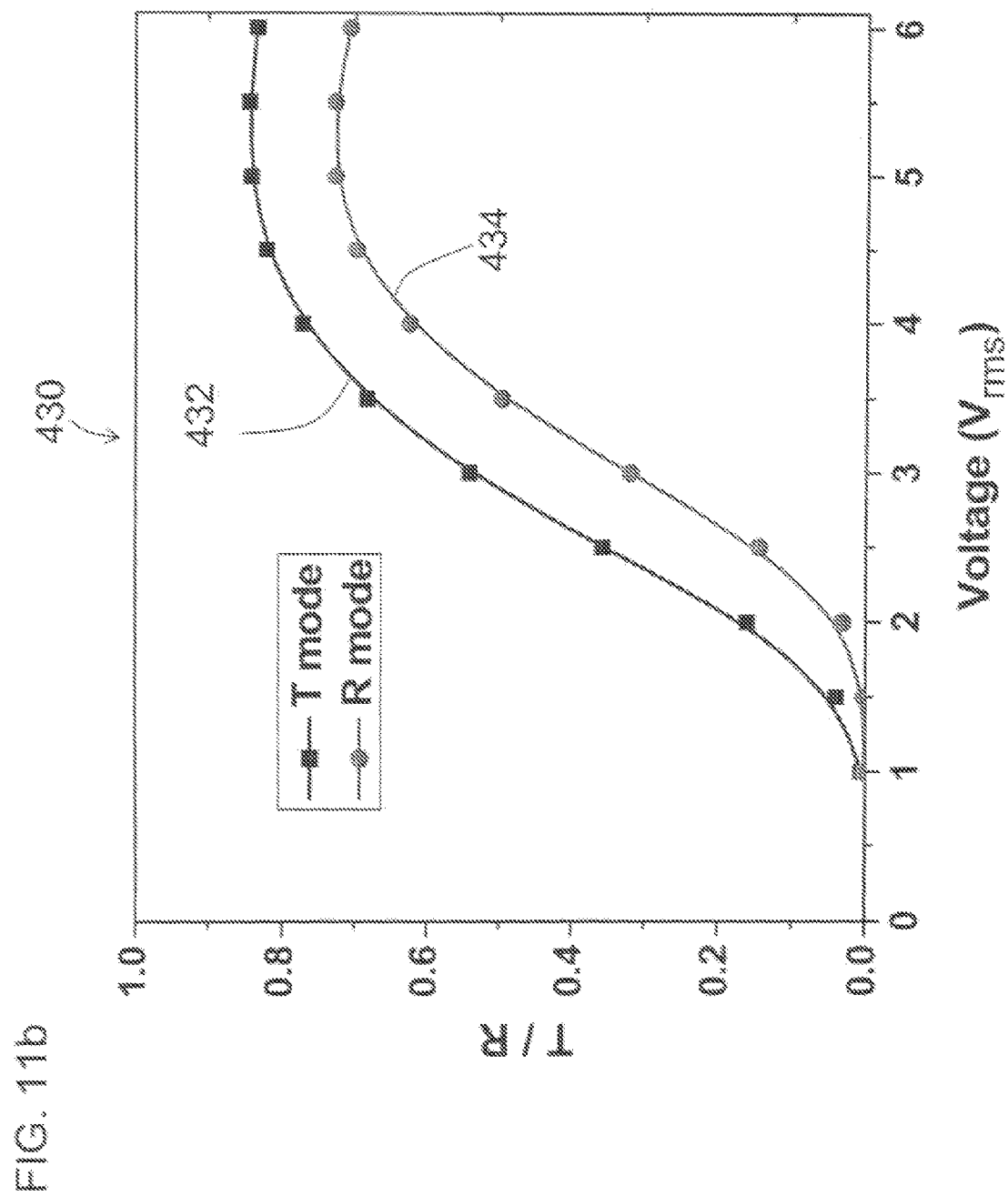
FIG. 11b is the VT and VR curves of the display with a positive LC material and electrode width W=3 μm, G=6 μm, and electrode angle ϕ=10°.

FIG. 11a is a graph 420 that shows another example using a negative dielectric anisotropy Δ∈ LC material with electrode width W equal approximately 3 μm and gap G equal approximately 8 μm. The VT curve 422 reaches approximately 90% light efficiency at V=approximately 6 Vrms and VR curve 424 reaches approximately 80% at approximately the same voltage. Similarly, FIG. 11b is a graph 430 that shows the example using a positive dielectric anisotropy Δ∈ LC material with electrode width W=approximately 3 μm and gap G=approximately 6 μm. The light efficiency of T mode reaches approximately 85% at V=approximately 5.5 Vrms as shown in curve 432, and the efficiency of R mode reaches approximately 70% at V=approximately 5.5 Vrms as shown in curve 434. As shown in FIGS. 11a and 11b, the basic shapes of the VT and VR curves seem to change little in response to the variation of the electrode width and gap.

Figure 12A:
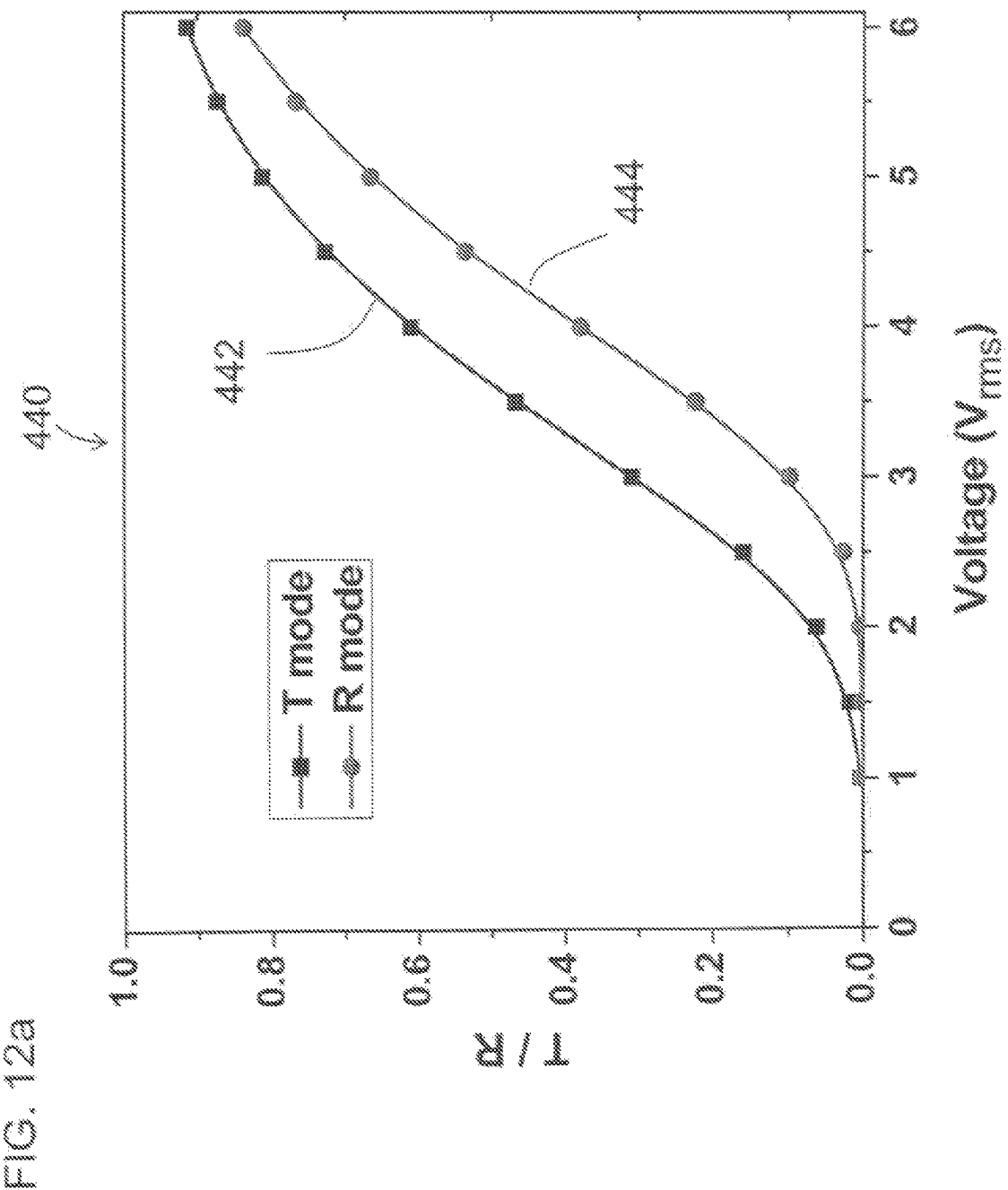
FIG. 12a is the VT and VR curves of the display with a negative LC material and electrode width W=3 μm, G=4 μm, and electrode angle ϕ=70°.
Figure 12B:
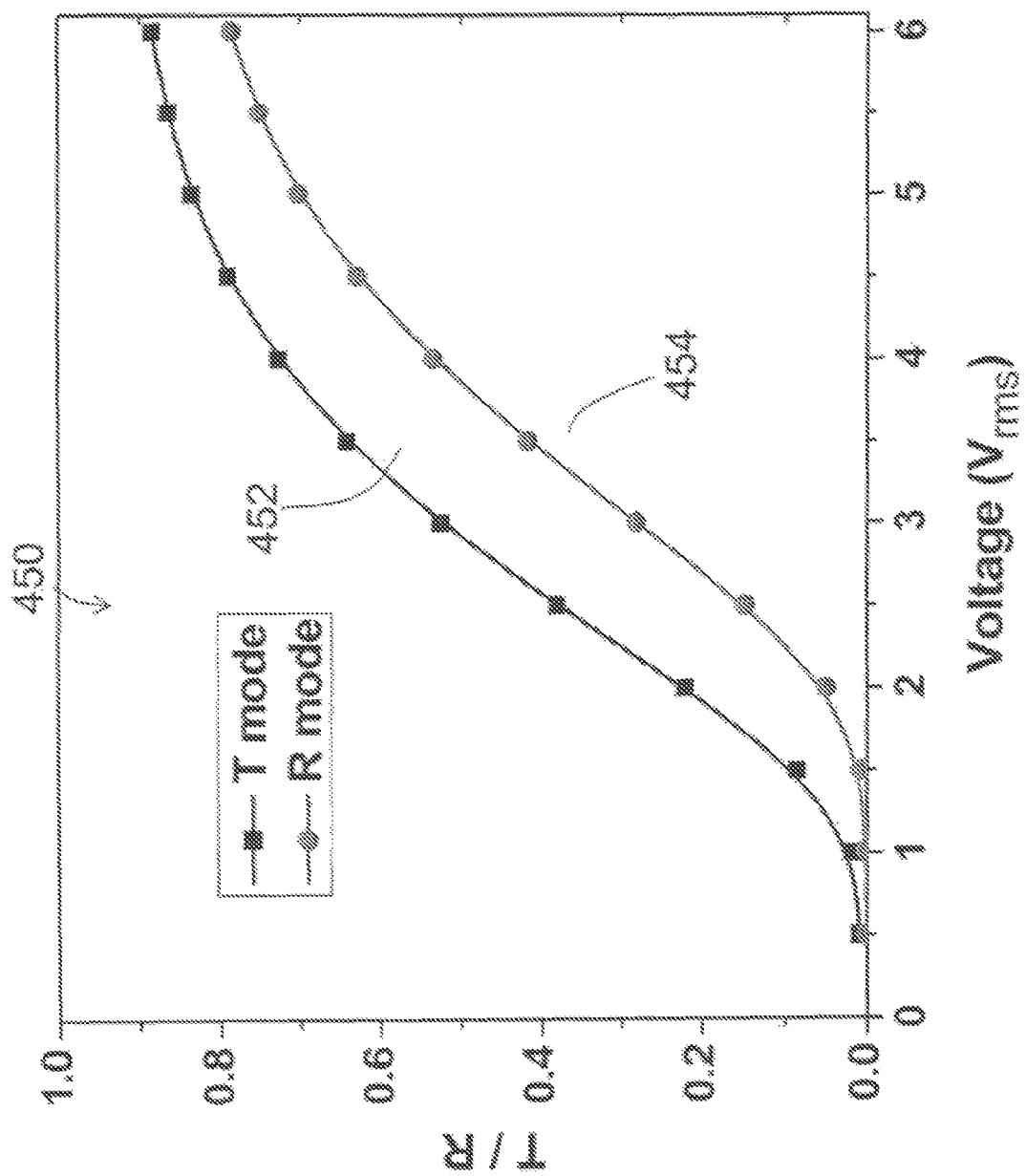
FIG. 12b is the VT and VR curves of the display with a positive LC material and electrode width W=2 μm, G=3 μm, and electrode angle ϕ=20°.

In another example, the electrode strip direction φ is varied with respect to the rubbing angle β for the cell configuration shown in FIGS. 1-7. In this example, the cell parameters are kept same as the parameters used to produce the VT 402 and VR 404 curves shown in FIG. 8a, with the exception that the electrode strip direction φ is changed from approximately 80° to approximately 70°. FIG. 12a is a graph 440 that shows the corresponding VT curve 442 and VR curve 444 when φ=approximately 70°. Because the effective rotation of the LC molecules away from the initial rubbing angle is less than 45°, the maximum light efficiency is also reduced for both T and R modes. Similarly for the cell using a positive LC material, the angle φ is changed from approximately 10° to approximately 20°, while keeping the other parameters approximately the same as the parameters used to produce graph 410 shown in FIG. 8b, the resulting VT curve 452 and VR curve 454 are shown in graph 450 of FIG. 12b. The maximum light efficiency is slightly reduced, but the shape of the curves is similar. From the analysis above, it is shown that the design has relatively large tolerance of the variation of the electrode width W, gap G, and electrode strip angle φ.

Figure 14A:
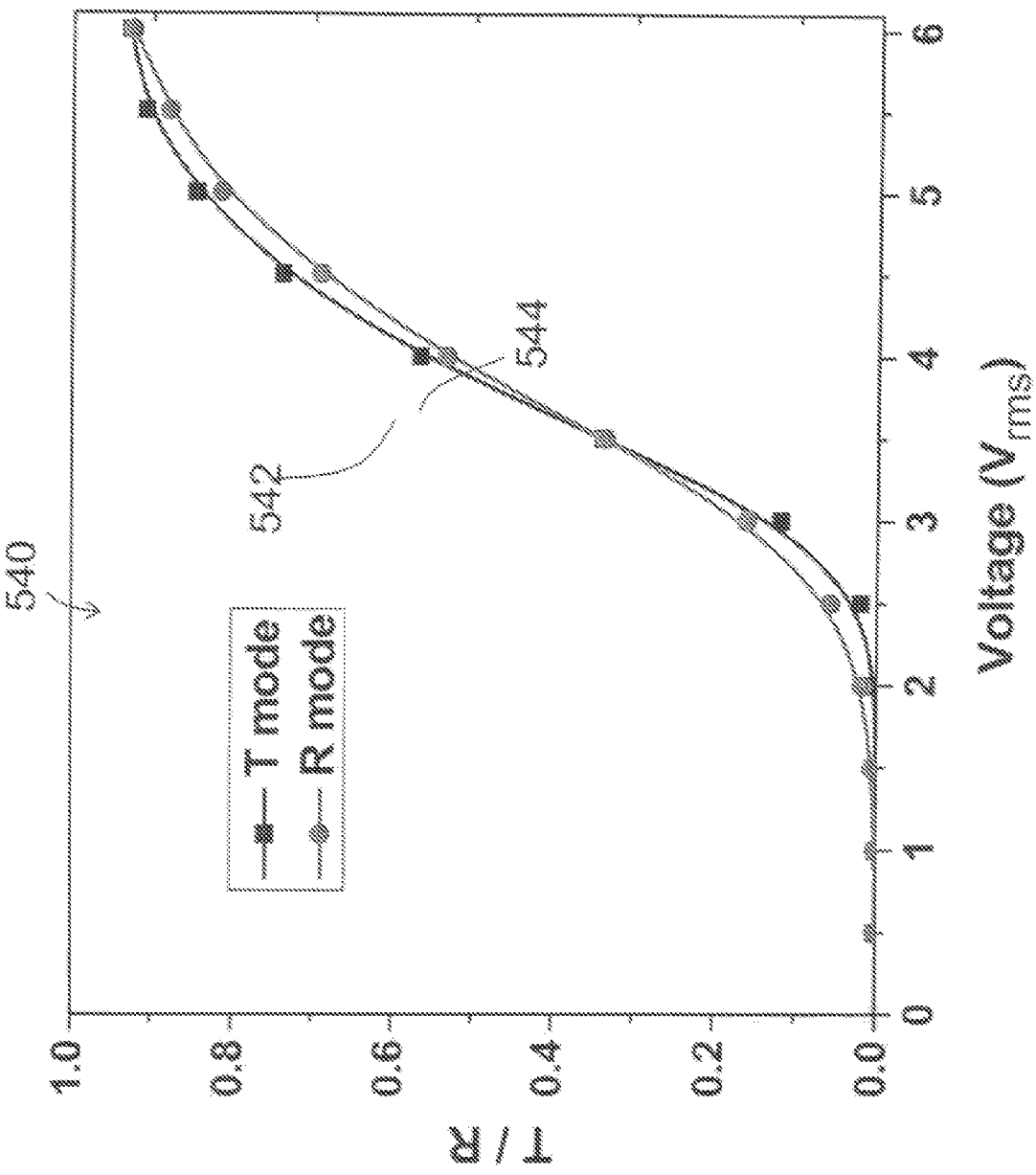
FIG. 14a is the VT and VR curves of the display with a negative LC material and electrode width W=3 μm, G=4.5 μm in the R region and W=3 μm, G=3 μm in the T region.
Figure 14B:
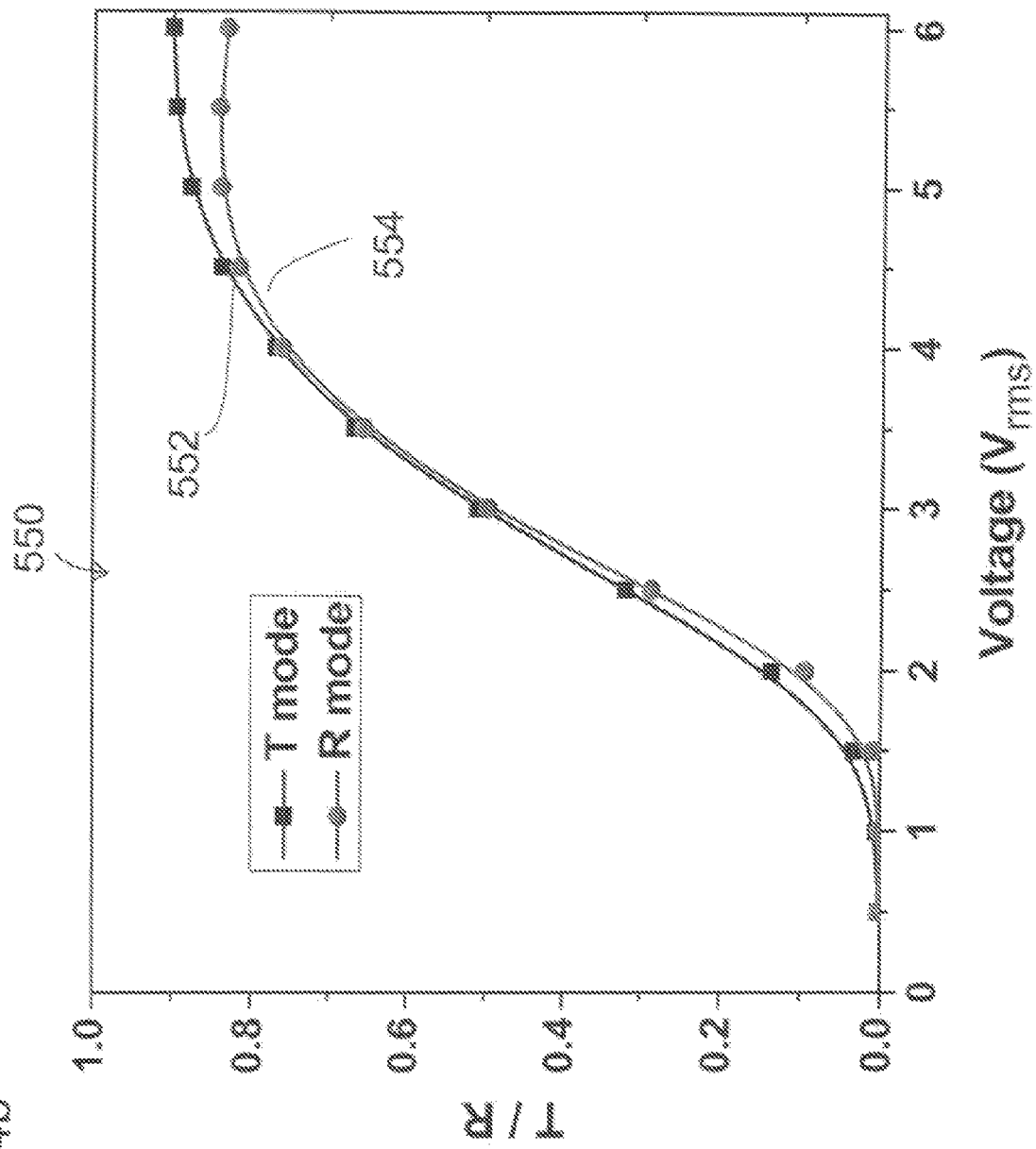
FIG. 14b is the VT and VR curves of the display with a positive LC material and electrode width W=3 μm, G=4 μm in the R region and W=3 μm, G=4.5 μm in the T region.

Yet in another example of the present invention is shown in FIG. 13. In this example, the electrode width W and distance (gap) G between adjacent electrodes of R pixel electrodes 109a are different in the R region 122 from electrode width W and gap G between adjacent pixel electrodes of T pixel electrodes 109b in the T region 124 of the LCD pixel 500. This configuration allows the designer to optimize the match between the VT and VR curves in response to the applied voltage. FIG. 14a is a graph 540 that shows the simulated VT 542 and VR 544 curves for the structure shown in FIG. 13, where in the reflective region 122 the width $W_R$ equal approximately 3 μm and the gap $G_R$ equal approximately 4.5 μm, and in the transmissive region 124 the width $W_T$ equal approximately 3 μm and the gap $G_T$ equals approximately 3 μm. In this example, the LC material is a negative Δ∈ LC material such as MLC-6608 from Merck. The cell gap is kept at 4 μm and rubbing angle β=0° and electrode strip direction φ=80°. For the VT curve 542 and VR curve 544 shown in FIG. 14a, when N=256 voltage points are sampled between gray-level 0 (wherein V=0.5 Vrms) and gray-level 255 (wherein V=6.0 Vrms), the RMS value of the difference between the T and R by $$\sqrt{\frac{\sum_{i=1}^{N}(T_i - R_i)^2}{N}}$$

is approximately 2.8%. Similarly, FIG. 14b is a graph 550 that shows the simulated VT and VR curves for the structure shown in FIG. 13, where the $W_R$=3μm, $G_R$=4 μm, $W_T$=3 μm, and $G_T$=4.5 μm, and the LC material is a positive Δ∈ LC material such as MLC-6686 from Merck. The RMS value of this case is between VT curve 552 and VR curve 554 is approximately 2.69%, if gray-level 0 is set at V=0.5 Vrms and gray-level 256 is set at V=5.5 Vrms. Although the width W and gap G in the T and R regions are different, they can be still fabricated by the same steps of photomasks as those using uniform width W and gap G in both of the T and R regions.

Figure 15A:
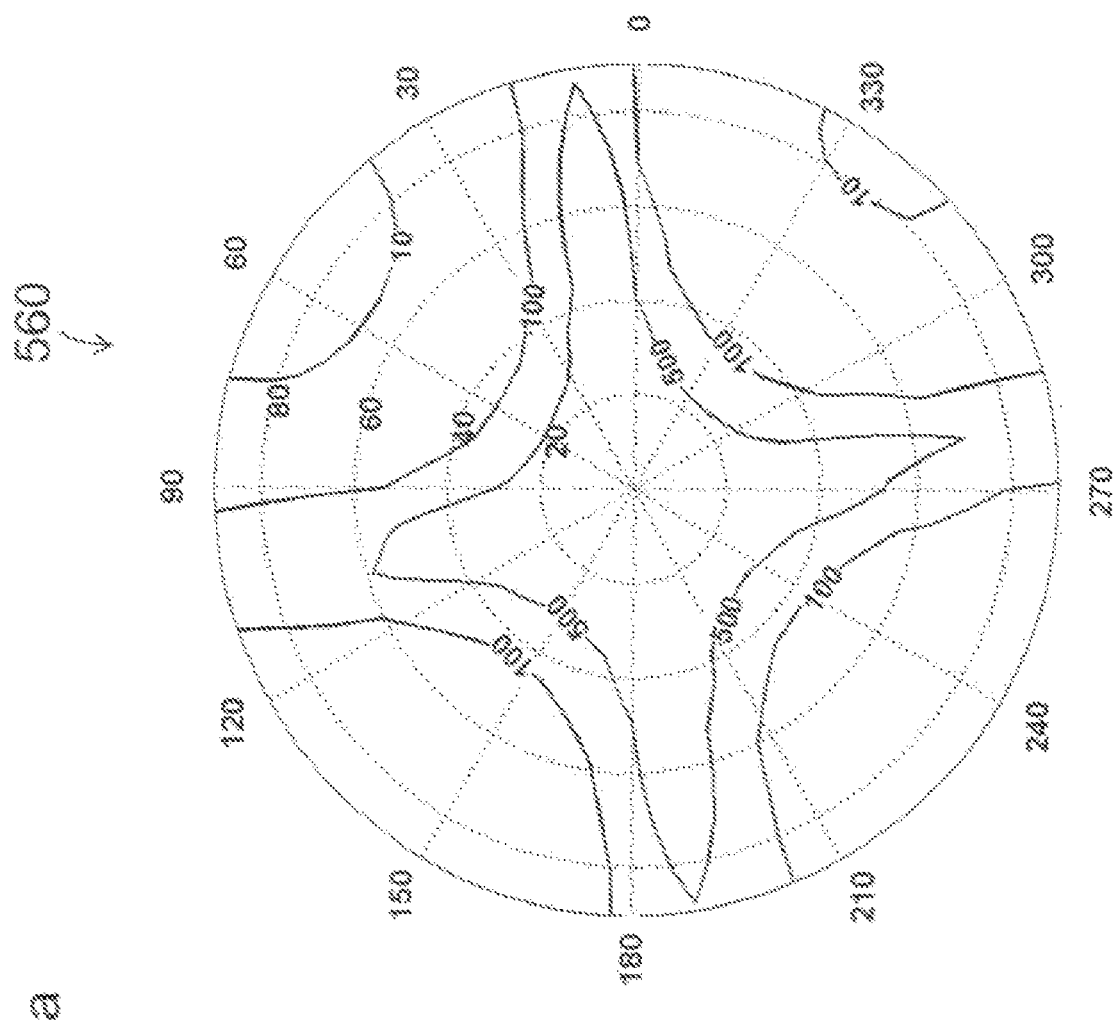
Figure 15B:
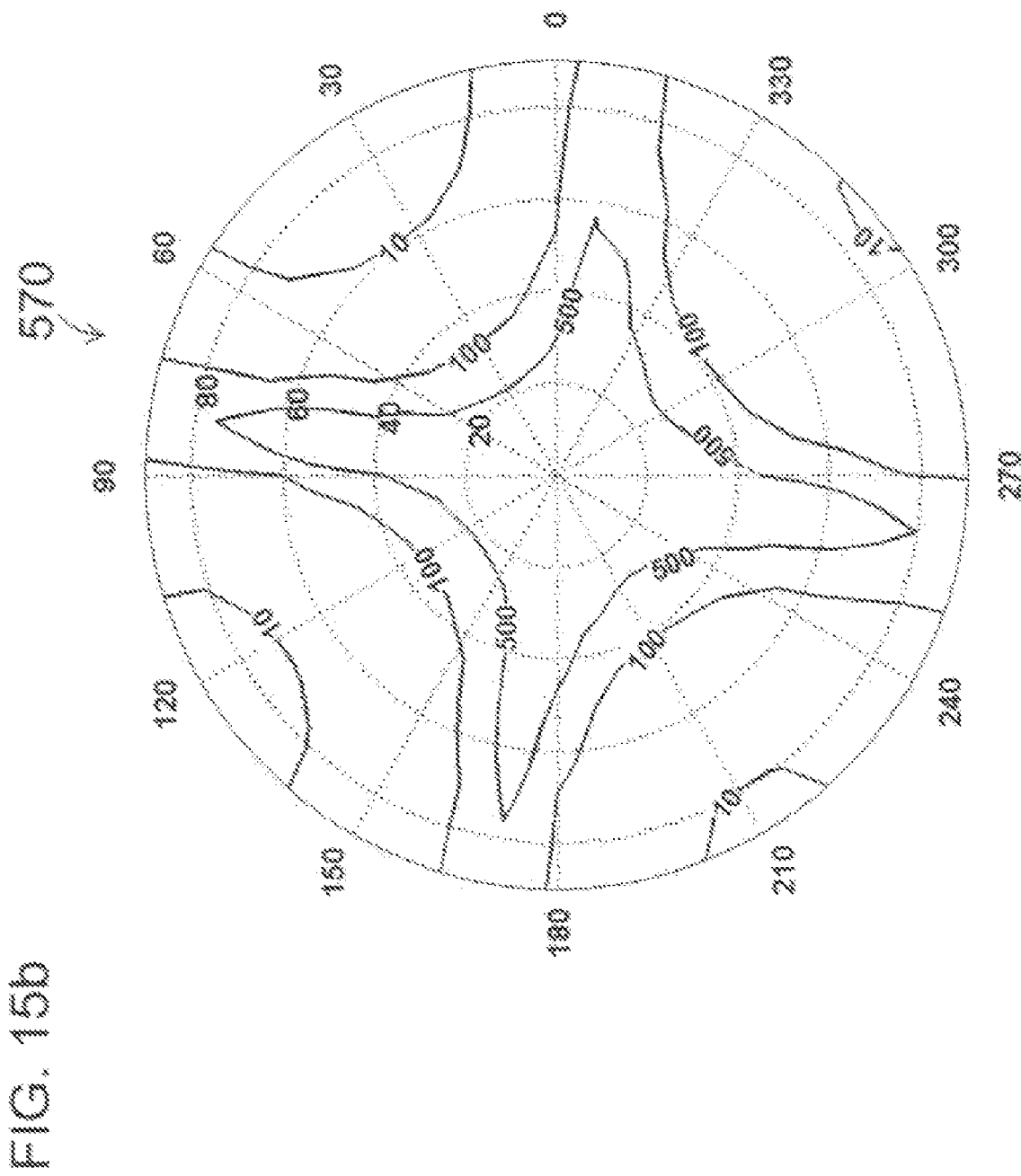
FIG. 15b is the viewing angle of the T mode in the structure of FIG. 14b.

Because of the removal of broadband quarter-wave plate in the present invention, for the T mode, the viewing angle is inherently wide even without additional compensation films. FIG. 15A shows the iso-contrast plot 560 for the T mode in the structure in FIG. 13 where $W_T$=3 μm, and $G_T$=3 μm and a negative LC material is used. As shown, the viewing cone with contrast ratio (CR)>10:1 is greater than approximately 85° at most of the azimuthal angles. Similarly, FIG. 15B shows the iso-contrast plot 570 for the T mode in the structure shown in FIG. 13 with $W_T$=3 μm and $G_T$=4.5 μm using a positive LC material. The CR is greater than 10:1 viewing cone is over 70° at most azimuthal directions. From these FIGS. 14a and 14b, it is shown that novel TRLCD design of the present invention is a wide viewing angle technology suitable for high performance display applications. In addition to the viewing angle, color shift is another important property to characterize the performance of a display.

Figure 16A:
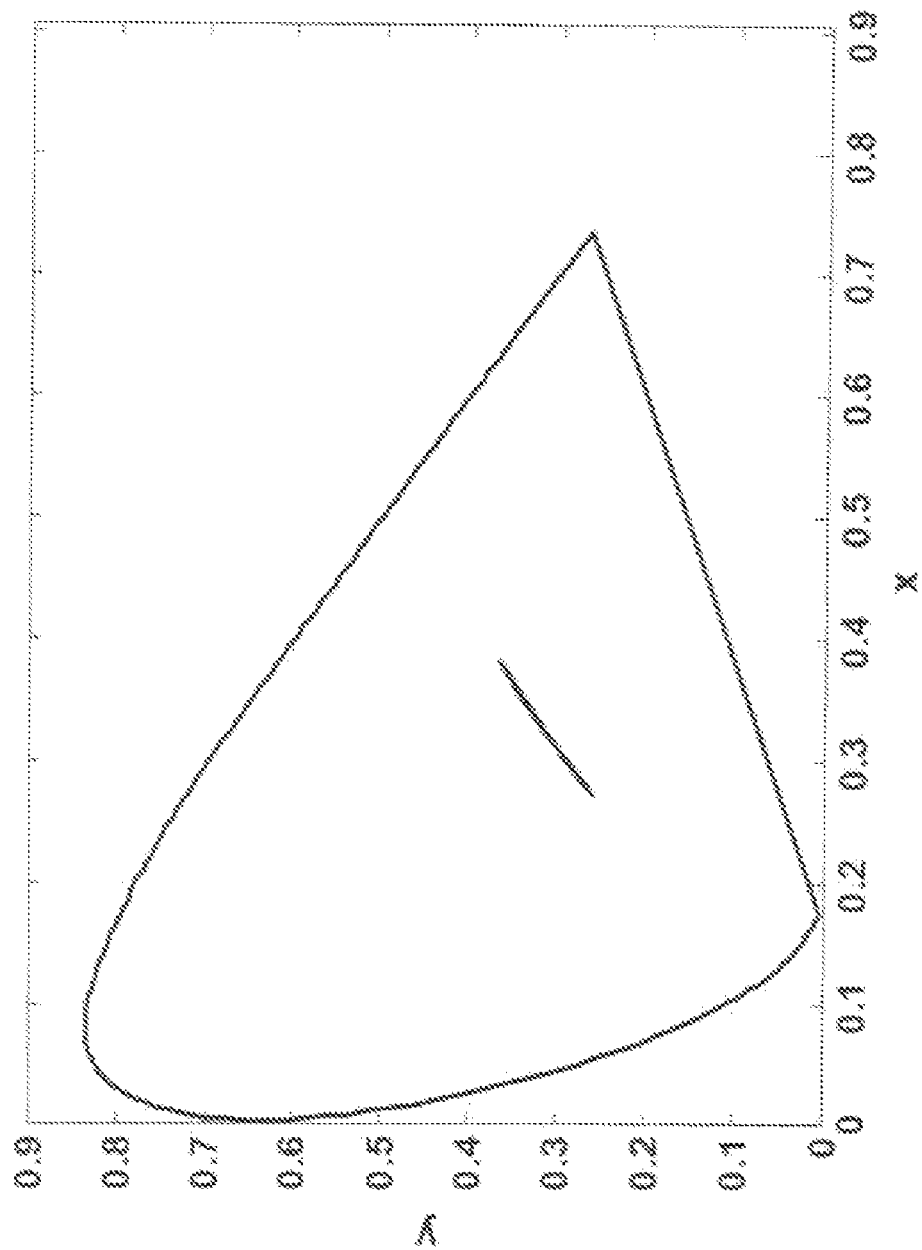
Figure 16B:
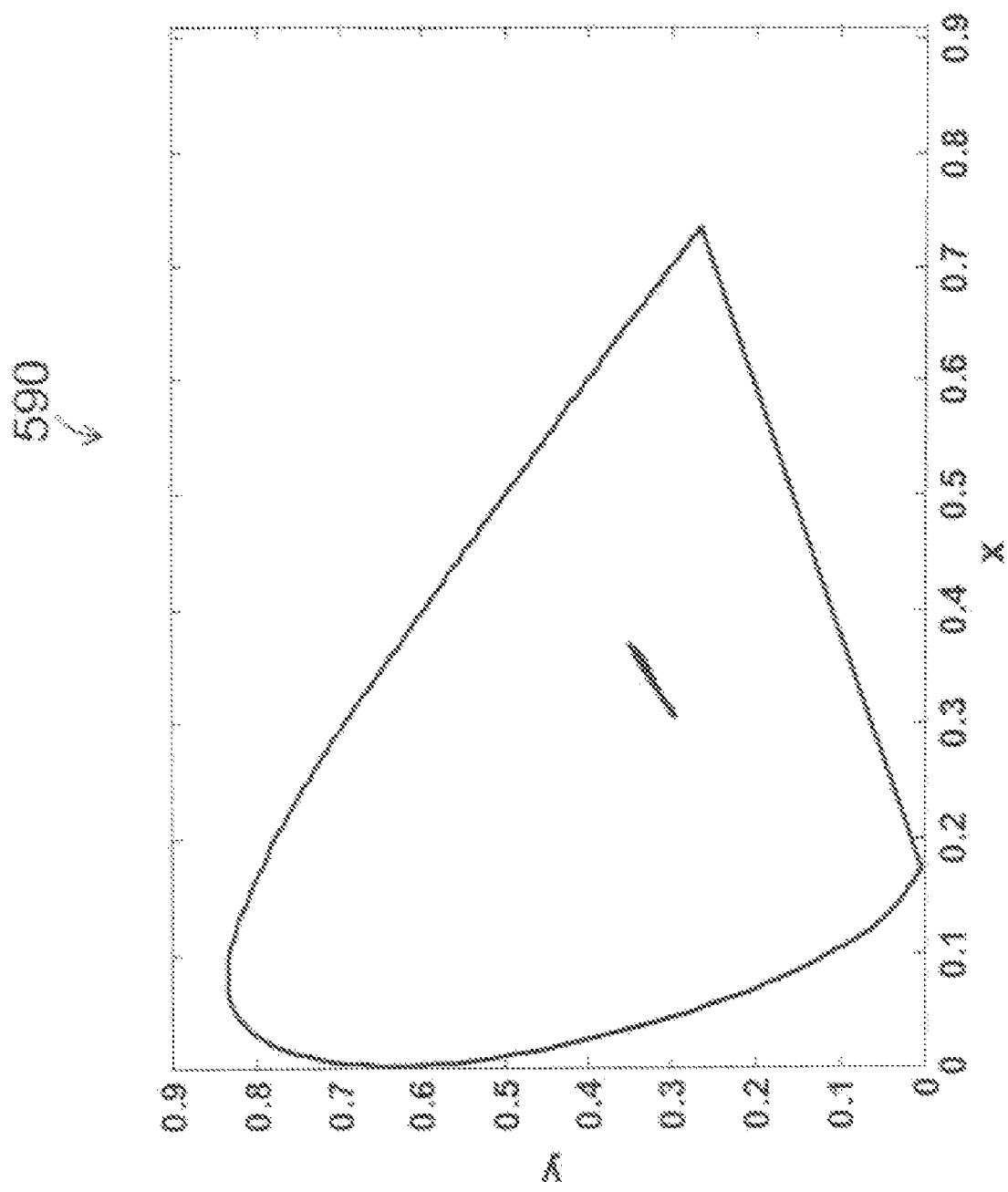
FIG. 16b is the color shift of the T mode in the structure of FIG. 14b.

When a LCD panel is illuminated by a white backlight such as D65 at its bright state, the output light has a special spectrum distribution after passing through the polarizers, the LC cell, and the color filters. This output light at the normal direction is specified by one color coordinate value in the CIE 1931 Chromaticity Diagram that is close to (x=0.33, y=0.33). However, the same backlight through the LCD panel has different color coordinate values if viewed from off-axis directions, which is called color shift. For the LC structure with same cell parameters for FIG. 15a, its color shift viewed at different azimuthal angles with a fixed off-axis polar angle equal to 60° is shown in the graph 580 in FIG. 16a. All the color coordinates are plotted in this figure and their trace shows all the possible colors it can viewed from different azimuthal angles with polar angle at 60°. In the cell using a negative LC material, the LC molecules experience a quite uniform rotation at the bright state and the domain is almost purely one-domain structure. As a result, the average color shift is quite evident. On the other hand, in the same cell in the graph 590 in FIG. 15b using a positive LC material, the color shift shown in FIG. 16b is relatively small as compared to that of FIG. 16a. It results in that a positive LC material will experience both substantial rotations and some tilts at the bright state. Therefore, there are multi-domain like structure of the LC molecules' distribution. To further suppress the color shift of the structures abovementioned, in the preferred embodiment, the multi-domain structure is highly preferred.

Figure 17:
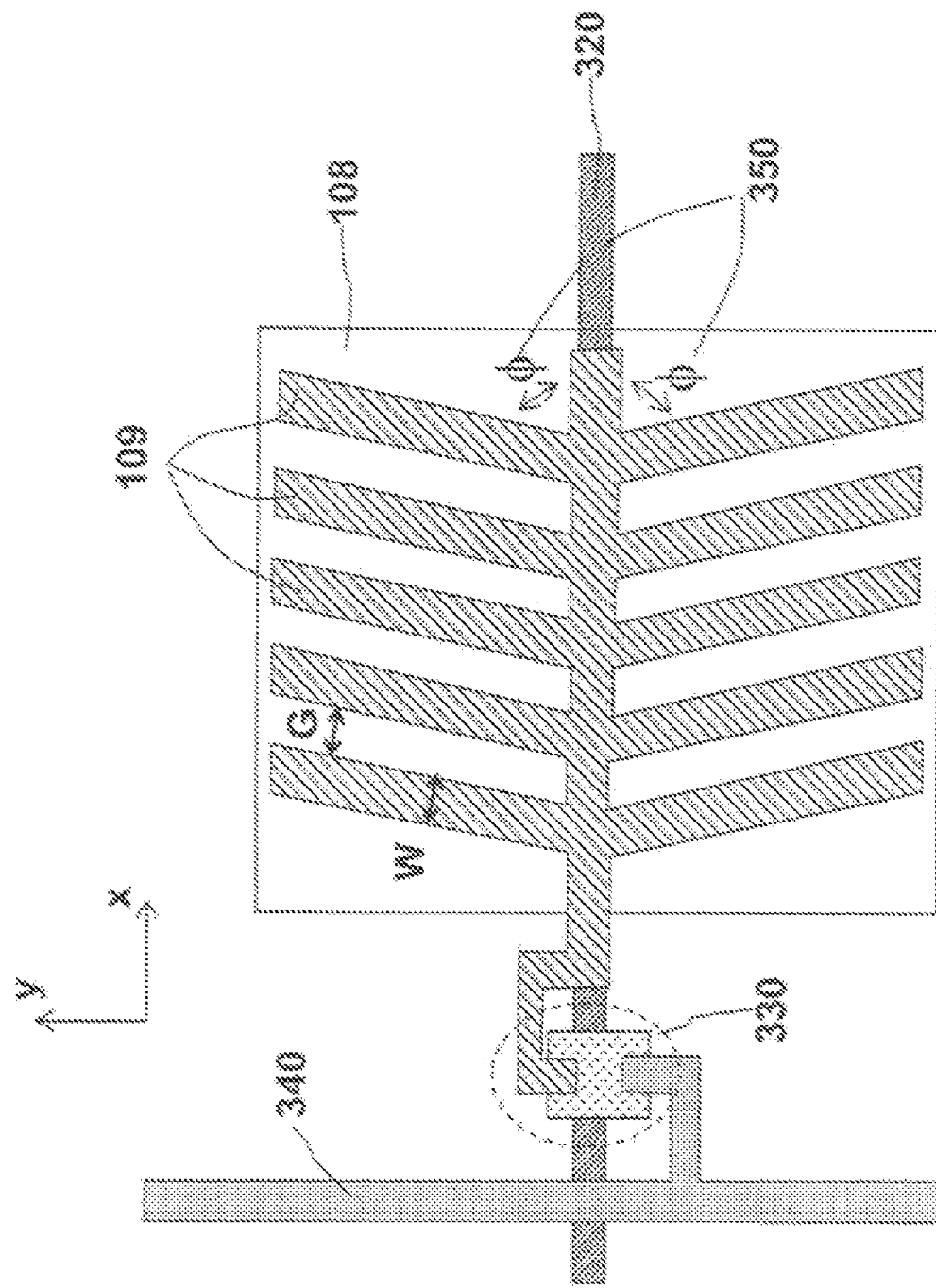
FIG. 17 is a top view of the chevron-shaped electrode TRLCD.

In yet another example of the present invention, a chevron-shaped electrode structure is introduced as shown in FIG. 17. The common electrode 108 is a transparent plane electrode and the pixel electrodes 109 are chevron-shaped strip-shaped transparent electrodes. In this alternative configuration, the x-y coordinate takes the transmission axis 130 of the top polarizer 101b as the reference x-direction. The pixel electrode strips 109 in one period have a top half plane and a bottom half plane shown in FIG. 17. Each part of the pixel electrode has a width of W and gap of G and the strips of both planes have an angle φ with respect to the x-axis. A TFT 330 controlled by gate line 320 is formed to control the voltage applied to the pixel electrode 109. The driving voltage comes from the data line 340.

Figure 18A:
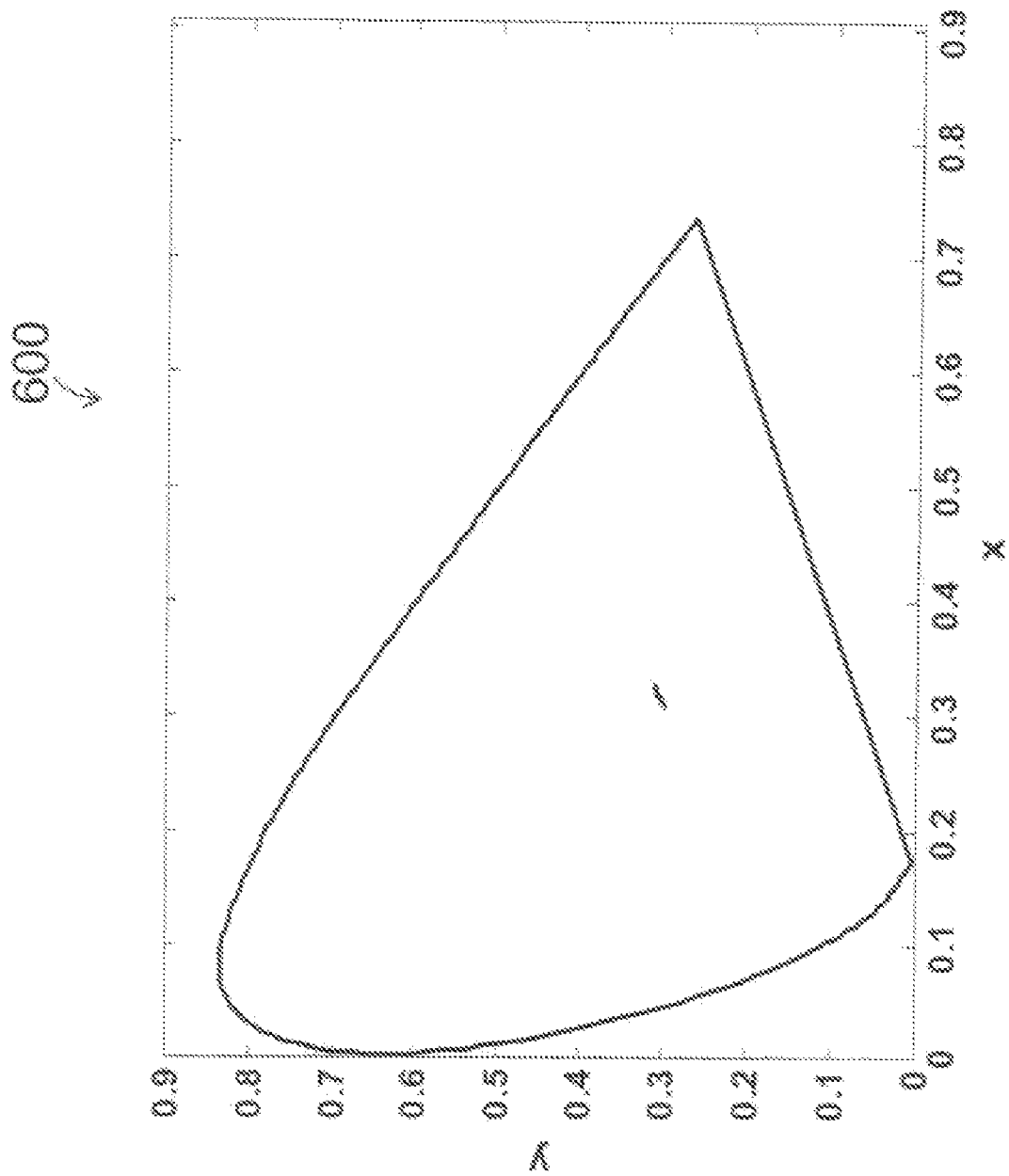
FIG. 18a is the color shift of the T mode in the structure of FIG. 17 with a negative LC material.
Figure 18B:
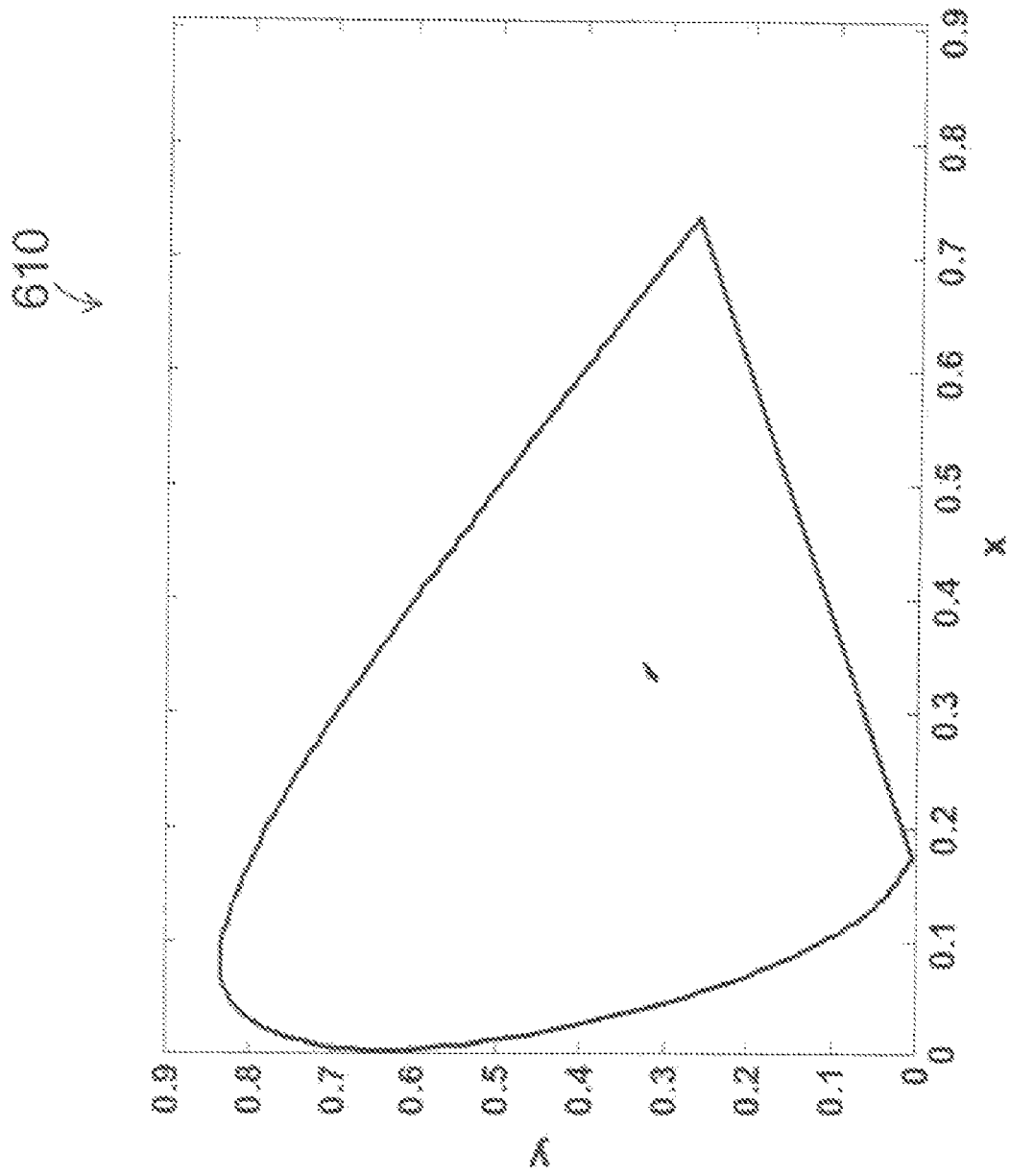
FIG. 18b is the color shift of the T mode in the structure of FIG. 17 with a positive LC material.

In the voltage-off state, the LC molecules are rubbed in a direction parallel to either the x- or the y-direction and the backlight transmitted through the bottom polarizer does not experience a phase retardation from the LC layer, and as a result is blocked the top polarizer. When a high voltage is applied to the pixel electrode 109, the LC molecules in the top part of the pixel electrode strips 109 is rotated by 45° towards one direction, and those in the bottom part will also be rotated by 45° towards the opposite direction of the LC molecules in the top half plane. Therefore the lights passing both top and bottom planes will have polarization rotation by approximately 90° and transmit through the top polarizer. Because more domains are introduced by the structure of the pixel electrodes shown in FIG. 17, the color shift is reduced. FIG. 18a is a graph 600 that shows the color shift of the cell using the same negative LC material, cell gap, electrode width W, and gap G as shown in FIG. 15a, but with two-domain structured electrodes as shown in FIG. 17. As shown, the color shift is greatly suppressed by the chevron shaped electrodes. Similarly, FIG. 18b is a graph 610 that shows the color shift of the cell using the same positive LC material, cell gap, electrode width, and gap G as shown in FIG. 15b, but with a two-domain shaped electrode. The color shift is very small and confined to the white point (0.33, 0.33). Thus, the multi-domain structured electrode shape in this example is used to improve the color performance of the display.

Figure 19:
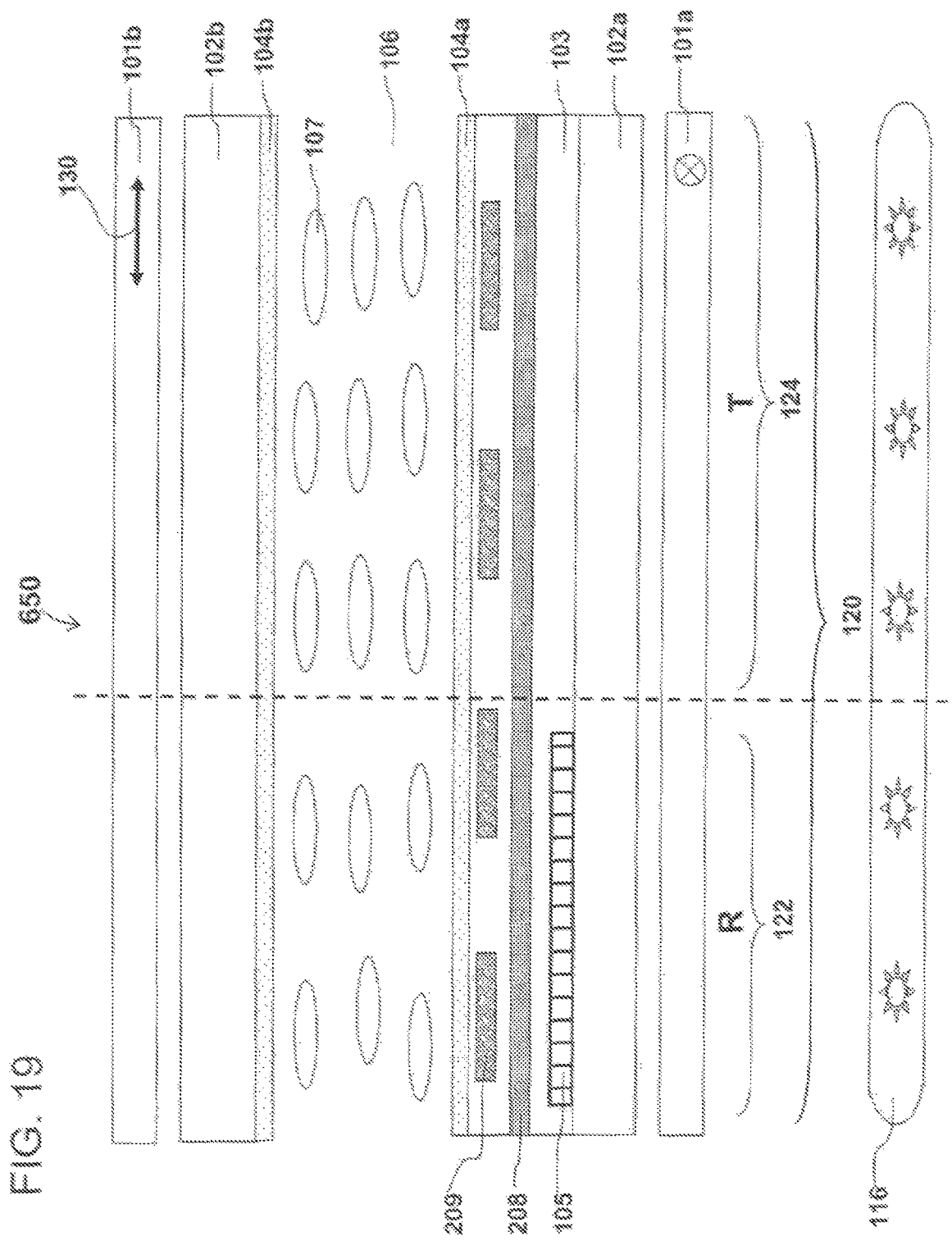
FIG. 19 is the cross-section view of the TRLCD with both TFT and WGP on one substrate

In all the abovementioned structures, the common electrode, the pixel electrode, and the TFT are formed in the top substrate as to separate their fabrication process from those for the WGP on the bottom substrate. Alternatively, both the wire grid polarizer WGP and the thin film transistor TFT are formed on one substrate as shown the display 650 configuration shown in FIG. 19. In this embodiment, the glass substrate 102a with the WGP 105 is covered by the passivation layer 103. Then the common electrode 208 and pixel electrode 209 are formed along with the TFT (not shown). In this example, when no voltage is applied, all the LC molecules are homogeneously aligned to the initial rubbing direction and the light passing through from the bottom polarizer does not change its polarization direction and is blocked by the top polarizer 101b to achieve a dark state. When a high voltage is applied, the voltage difference between the pixel electrode 209 and the common electrode 208 generates fringe fields with rich horizontal components that rotate the LC molecules horizontally to change the polarization direction of the input backlight to achieve the bright state.

FIG. 20 is a diagram of an example of the liquid crystal display 100, which includes an array 12 of pixels 90 that are controlled by one or more gate drivers 16 and one or more data drivers 18. Referring to FIG. 2 in conjunction with FIG. 13, each pixel 90 includes one or more thin film transistors 70 having a source driven by the data driver 18, a gate 80 driven by the gate line 82 and a drain 76. The pixel circuit also includes a storage capacitor $C_{ST}$ 72, and a liquid crystal cell which has an effective capacitance represented by $C_{LC}$ 74. The capacitors $C_{ST}$ 72 and $C_{LC}$ 74 can be, e.g., connected in parallel to the pixel electrode 109. The capacitor $C_{LC}$ 74 is connected between the pixel electrode 109 and the common electrode 108. For example, the storage capacitor $C_{ST}$ 72 can be connected between the pixel electrode 109 and the common electrode 108, or between the pixel electrode 109 and the gate line 82 of another pixel in the next row.

The thin film transistor 70 includes a gate 80 that is connected to gate line 82, which is connected to the gate driver 16. When the gate driver 16 drives the gate line 82 to turn on the thin film transistor 80, the data driver 18 simultaneously drives a data line 84 with a pixel voltage signal (e.g., $V_{DATA}$), which is passed to the storage capacitor $C_{ST}$ 72 and the liquid crystal cell. The voltage (e.g., $V_{DATA}$) across the capacitor $C_{ST}$ 72 determines the voltage applied to the liquid crystal cell. The voltage on the data line 84 is sometimes referred to as a "gray scale voltage" because it determines the gray scale level shown by the pixel 90.

In summary, the structures of the present invention attain good light efficiency and inherently wide viewing angle. Besides, a single gray-scale gamma curve can be used to drive the transmissive and reflective mode.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A transflective liquid crystal display device comprising:
  a plurality of pixel circuits sandwiched between a first substrate and a second substrate, each pixel circuit comprising:
    a reflective region comprising a first portion of a liquid crystal layer and a polarization dependent reflector that transmits light having a first polarization and reflects light having a second polarization;
    a transmissive region comprising a second portion of the liquid crystal layer;
    at least one transparent common electrode formed on the inner surface of one of the first and second substrate; and
    at least one transparent pixel electrode formed on an outer surface of the same substrate as the common electrode, the at least one common electrode and at least one
  pixel electrode insulated by a passivation layer therebetween; the liquid crystal molecules in the reflective and transmissive regions are substantially aligned along a direction parallel to the first and second substrate when no voltage is applied to the at least one common and at least one pixel electrodes, and horizontal electric fields that are substantially parallel to the first and second substrate are generated in the liquid crystal layer to rotate liquid crystal molecules substantially in a plane parallel to the first and second substrate, when a high voltage is applied to the pixel electrode.

2. The display of claim 1 wherein the common electrode is a plane electrode.

3. The display of claim 1 wherein the pixel electrode comprises:
  at least two electrode strips that are parallel to each other having an electrode width between approximately 1 μm and approximately 6 μm and a gap between adjacent strips between approximately 1 μm and approximately 10 μm.

4. The display of claim 3 wherein a shape of each of the at least two pixel electrode strips is selected from a group consisting of straight, curved, and piecewise linear shapes.

5. The display of claim 3 wherein the electrode width and the gap between adjacent pixel electrode strips are approximately equal in the reflective region and transmissive region.

6. The display of claim 3 wherein the electrode width and the gap between adjacent pixel electrode strips in the reflective region is different than the electrode width and gap between adjacent pixel electrode strips in the transmissive region.

7. The display of claim 1 wherein the at least one common electrode and at least one pixel electrode are made of one of an indium tin oxide, indium zinc oxide, and gallium zinc oxide material.

8. The display of claim 1 wherein the passivation layer is one of a silicon dioxide and silicon nitride material.

9. The display of claim 1, further comprising:
   a first linear polarizer on an outer surface of the first substrate; and
   a second linear polarizer on an outer surface of the second substrate, wherein the first and the second linear polarizer extend over the transmissive and reflective regions.

10. The display of claim 9 wherein the first linear polarizer has a transmission axis perpendicular to the transmission of the second linear polarizer.

11. The display of claim 9 wherein the first linear polarizer is located adjacent to a viewer than the second linear polarizer and the polarization dependent reflector has a reflective axis perpendicular to the transmission axis of the first linear polarizer.

12. The display of claim 9 wherein the polarization dependent reflector comprises:
   a wire grid polarizer.

13. The display of claim 12 wherein the reflection axis of the polarization dependent reflector is perpendicular to the transmission axis of one of the first linear polarizer that is closer to the viewer.

14. The display of claim 1 wherein the polarization dependent reflector comprises:
   a wire grid polarizer.

15. The display of claim 1 wherein the liquid crystal layer sandwiched between the first and second substrates has a rubbing direction parallel to the transmission axis of the first linear polarizer.

16. The display of claim 1 wherein the liquid crystal layer sandwiched between the first and second substrates has a rubbing direction perpendicular to the transmission axis of the first second polarizer.

17. The display of claim 1 wherein the liquid crystal layer comprises:
   a negative dielectric anisotropic liquid crystal material.

18. The display of claim 1 wherein the liquid crystal layer comprises:
   a positive dielectric anisotropic liquid crystal material.

19. The display of claim 17 wherein the pixel electrode comprises:
   at least two pixel electrode strips each having a lengthwise strip direction that forms a cross angle within a range of approximately 45° and approximately 90° with respect to a lengthwise direction of a rubbing axis of the negative dielectric anisotropic liquid crystal material.

20. The display of claim 18 wherein the pixel electrode comprises:
   at least two pixel electrode strips each having a lengthwise strip direction that forms a cross angle within a range between 0° and approximately 45° with respect a lengthwise direction of a rubbing axis of the positive dielectric anisotropic liquid crystal material.

* * * * *